(12) United States Patent
Kamada et al.

(10) Patent No.: US 10,114,179 B2
(45) Date of Patent: Oct. 30, 2018

(54) OPTICAL CONNECTOR, PIN KEEPER, PIN INSERTION JIG, EXPANSION MEMBER, AND PIN INSERTION TOOL

(71) Applicant: SEI Optifrontier Co., Ltd., Yokohama-shi, Kanagawa (JP)

(72) Inventors: Tsutomu Kamada, Chigasaki (JP); Kenichiro Ohtsuka, Chigasaki (JP); Motoyoshi Kimura, Komaki (JP); Tatsuhiko Shitomi, Komaki (JP)

(73) Assignee: SEI OPTIFRONTIER CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/523,749

(22) PCT Filed: Oct. 28, 2015

(86) PCT No.: PCT/JP2015/080411
§ 371 (c)(1),
(2) Date: May 2, 2017

(87) PCT Pub. No.: WO2016/072330
PCT Pub. Date: May 12, 2016

(65) Prior Publication Data
US 2017/0315308 A1    Nov. 2, 2017

(30) Foreign Application Priority Data

Nov. 7, 2014   (JP) ................................. 2014-227346
Jan. 29, 2015  (JP) ................................. 2015-015422

(51) Int. Cl.
*G02B 6/38* (2006.01)

(52) U.S. Cl.
CPC ......... *G02B 6/3882* (2013.01); *G02B 6/3885* (2013.01); *G02B 6/3898* (2013.01)

(58) Field of Classification Search
None
See application file for complete search history.

(56) References Cited

U.S. PATENT DOCUMENTS

| 2002/0110333 | A1 | 8/2002 | Yang |
| 2004/0152354 | A1 | 8/2004 | Luther et al. |
| 2017/0205589 | A9* | 7/2017 | Nguyen ............... G02B 6/3882 |

FOREIGN PATENT DOCUMENTS

| JP | 2003-014983 A | 1/2003 |
| JP | 2008-292604 A | 12/2008 |

(Continued)

*Primary Examiner* — Ryan Lepisto
*Assistant Examiner* — Erin Chiem
(74) *Attorney, Agent, or Firm* — Drinker Biddle & Reath LLP

(57) ABSTRACT

An optical connector is an optical connector that is connected to another connector in a predetermined connection direction. The optical connector includes a ferrule that includes insertion holes into which guide pins to be connected to another connector are to be inserted; and a pin keeper 20 that is provided on a side of the ferrule opposite to the another connector and includes retaining holes 21 retaining the guide pins inserted into the insertion holes. The pin keeper 20 includes a pair of side portions 22 in which the retaining holes 21 are formed, and a bottom portion 23 that connects end portions of the pair of side portions 22. The retaining holes 21 are formed in a shape in which inside surfaces of the side portions 22 facing each other are notched.

12 Claims, 24 Drawing Sheets

(56) References Cited

FOREIGN PATENT DOCUMENTS

| JP | 2013-540289 A | 10/2013 |
| WO | WO-2011/087093 A1 | 7/2011 |
| WO | WO-2012/054174 A1 | 4/2012 |

* cited by examiner

*Fig.5*
(a)
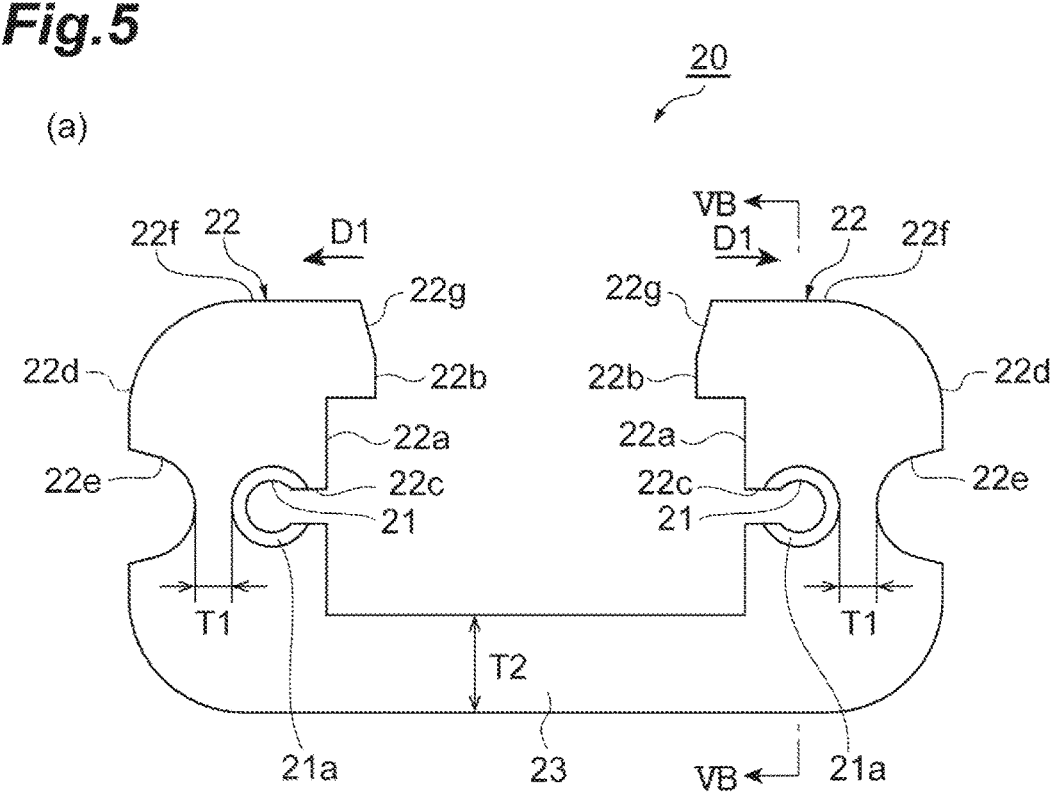
(b)
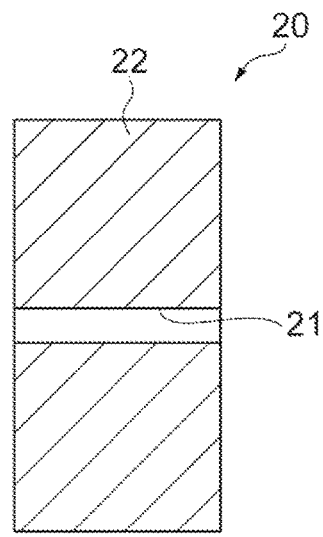

Fig.9
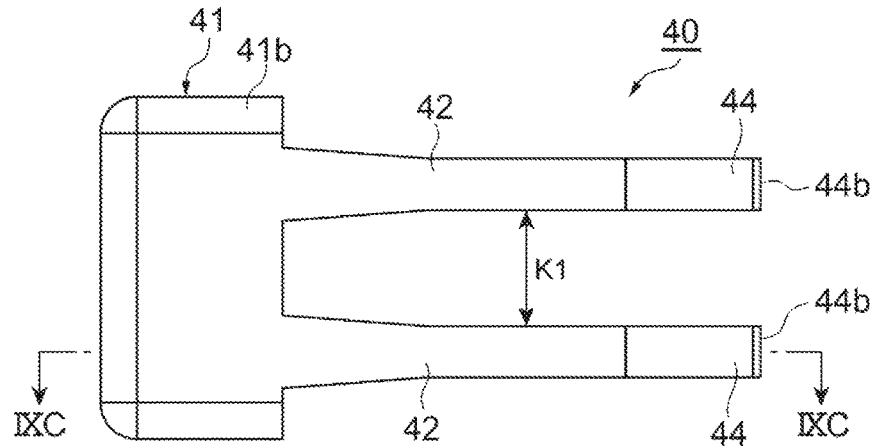
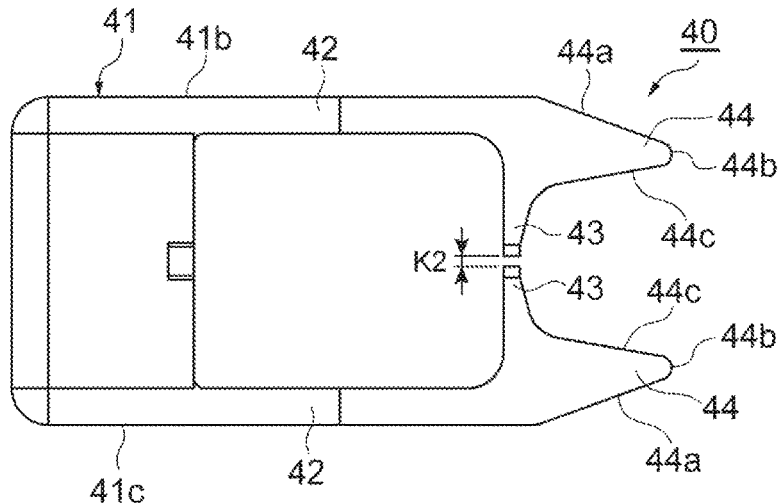
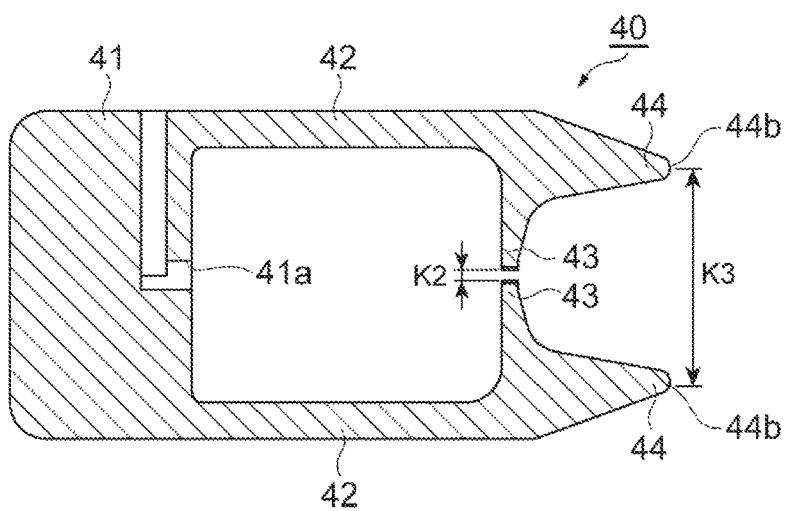

*Fig.14*
(a)
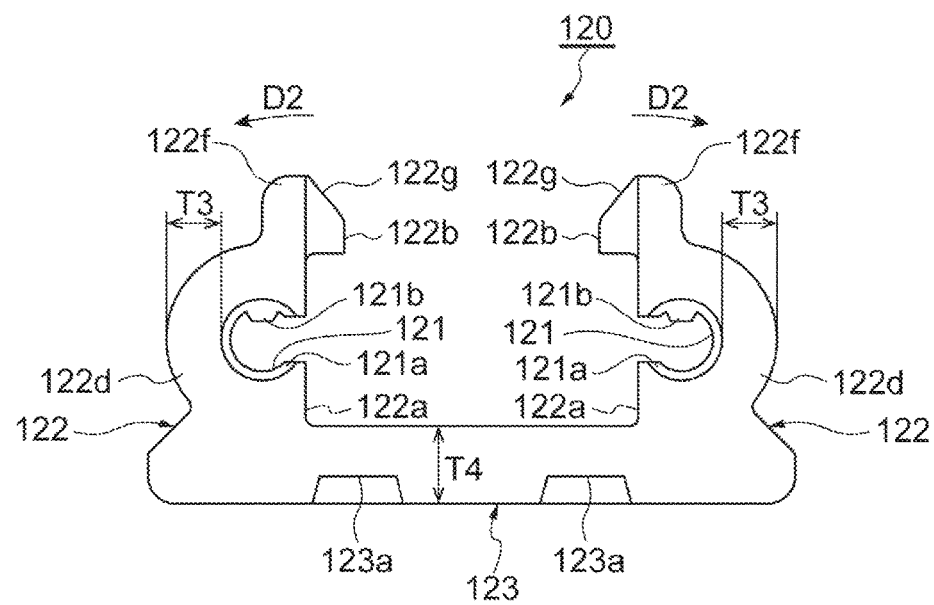
(b)
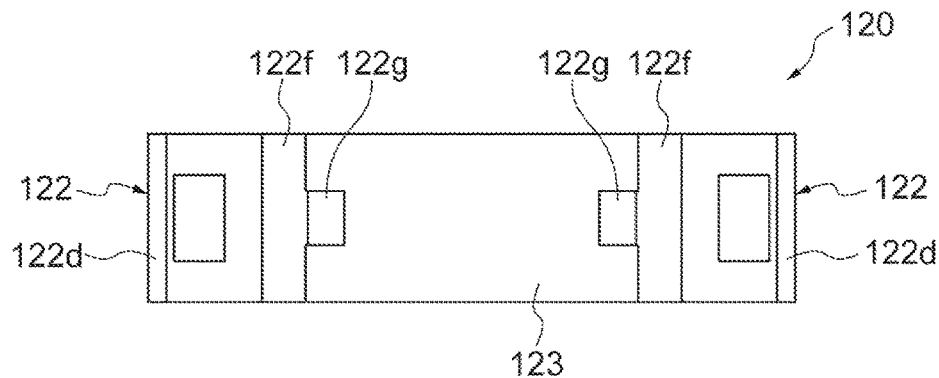
(c)
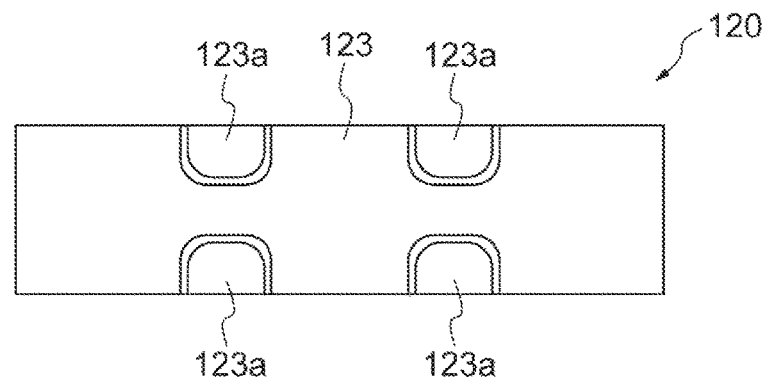

Fig.18
(a)
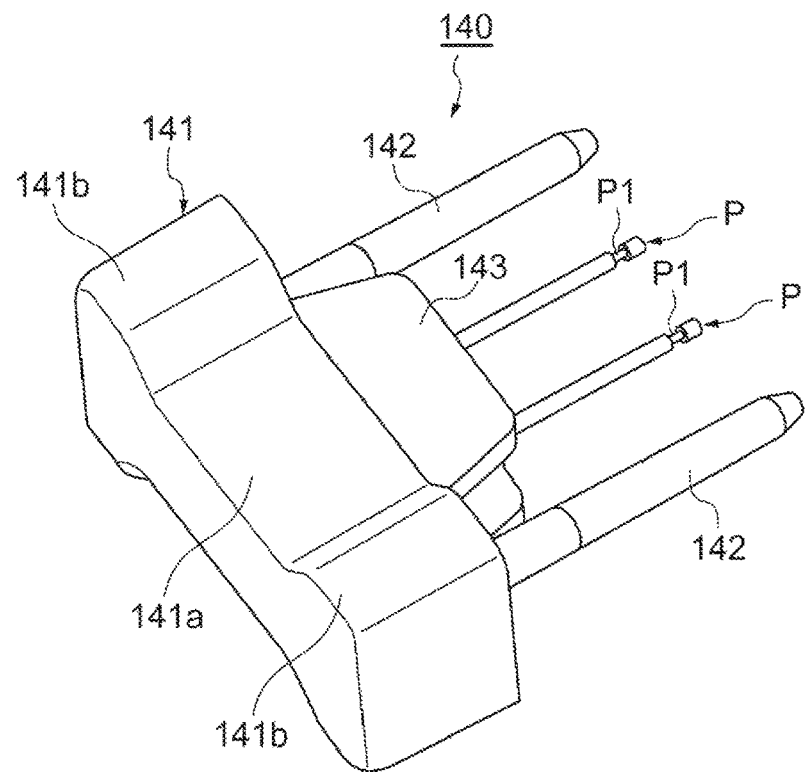
(b)
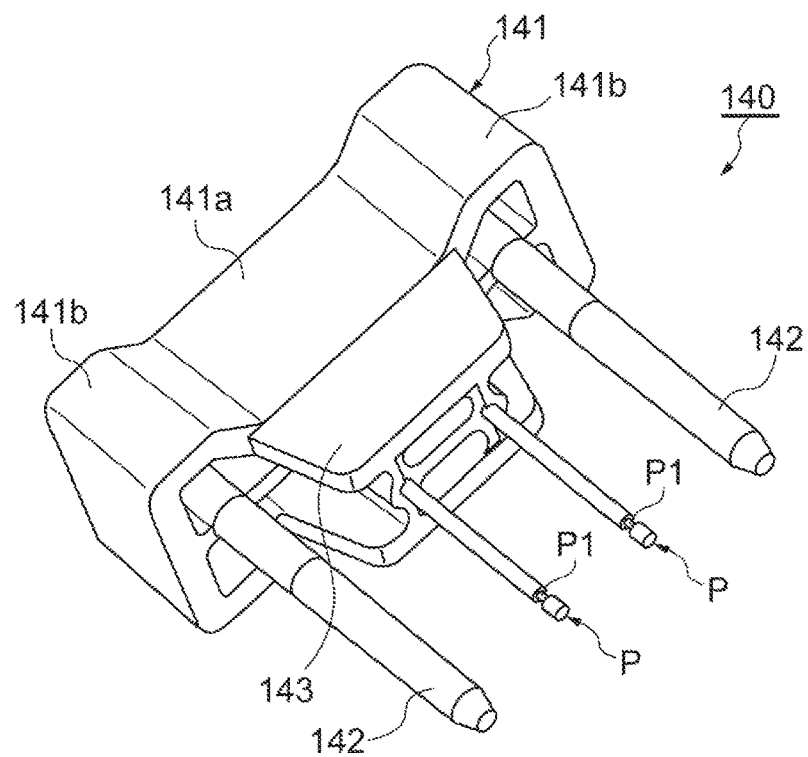

Fig.19
(a)
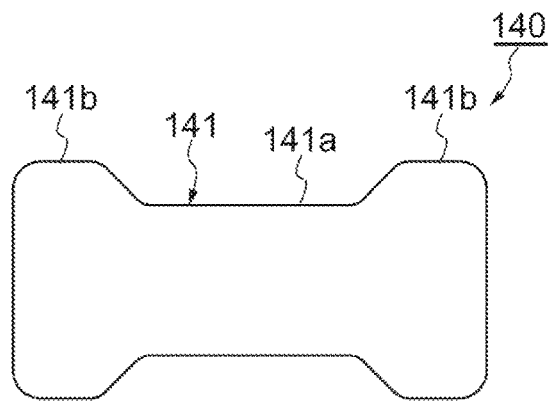
(b)
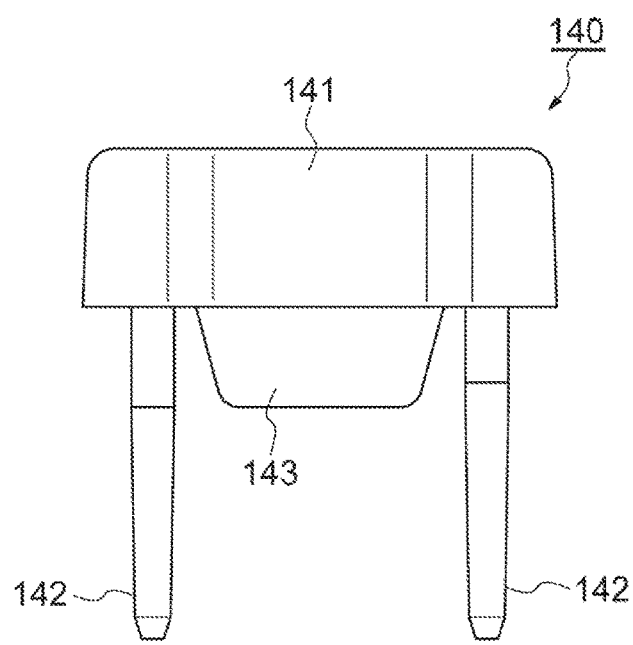
(c)
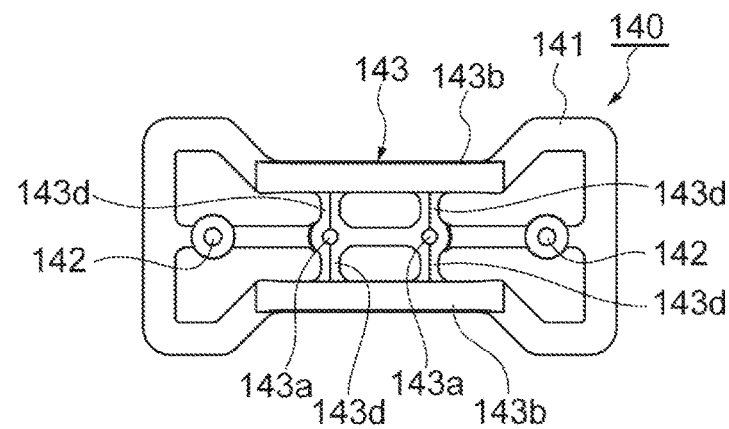

OPTICAL CONNECTOR, PIN KEEPER, PIN INSERTION JIG, EXPANSION MEMBER, AND PIN INSERTION TOOL

TECHNICAL FIELD

The present invention relates to an optical connector that includes a pin keeper retaining pins inserted into a ferrule, a pin keeper, a pin insertion jig, an expansion member that expands retaining holes of a pin keeper into which pins are to be inserted, and a pin insertion tool that inserts pins into retaining holes.

BACKGROUND ART

Patent Literature 1 discloses an MPO connector including two alignment pins that are connected to another connector, a ferrule into which the two alignment pins are inserted, and an inner housing and an outer housing that are provided so as to surround the ferrule. The two alignment pins of the MPO connector pass through an alignment pin cavity that is positioned in the ferrule. The inner housing includes a pin clamp that retains the alignment pin passing through the alignment pin cavity, and a tab that includes a hole portion which is provided at a portion continued to the pin clamp and into which a tool is inserted.

When a tool is inserted into the hole portion of the tab and the pin clamp is moved in a direction orthogonal to the end face of the ferrule by the tool, the two alignment pins are moved in the alignment pin cavity. Since the two alignment pins are moved in the alignment pin cavity, each of the alignment pins can protrude from the end face of the ferrule or can be received in the ferrule. As described above, the switching between a male connector and a female connector can be performed in the above-mentioned MPO connector.

CITATION LIST

Patent Literature

[Patent Literature 1] Japanese Unexamined Patent Publication No. 2013-540289

SUMMARY OF INVENTION

Technical Problem

When an optical connector is to be switched into a female connector, the optical connector has only to include the alignment pin cavity into which the alignment pins are to be inserted and does not need to include the alignment pins themselves. However, in the above-mentioned optical connector, the alignment pins can be received in the ferrule but the alignment pins cannot be removed from the ferrule. Since the alignment pins cannot be attached to and detached from the ferrule as described above, the alignment pins have to be mounted even when the alignment pins are not needed. Accordingly, there is a problem that additional costs are required for the manufacture or the like of the alignment pins.

An object of an aspect of the invention is to provide an optical connector, a pin keeper, a pin insertion jig, an expansion member, and a pin insertion tool that allow pins to be attached to and detached from a ferrule.

Solution to Problem

An optical connector according to an aspect of the invention is an optical connector that is connected to another connector in a predetermined connection direction. The optical connector includes: a ferrule that includes insertion holes into which pins to be connected to the another connector are to be inserted; and a pin keeper that is provided on a side of the ferrule opposite to the another connector and includes retaining holes retaining the pins inserted into the insertion holes. The pin keeper includes a pair of side portions in which the retaining holes are formed, and a bottom portion that connects end portions of the pair of side portions. The retaining holes are formed in a shape in which inside surfaces of the side portions facing each other are notched.

A pin keeper according to another aspect of the invention is a pin keeper provided in an optical connector that includes a ferrule including insertion holes into which pins to be connected to another connector are to be inserted and is connected to the another connector by the connection of the pins. The pin keeper includes: a pair of side portions in which retaining holes retaining the pins inserted into the insertion holes are formed; and a bottom portion that connects end portions of the pair of side portions. The retaining holes are formed in a shape in which inside surfaces of the side portions facing each other are notched.

A pin insertion jig according to still another aspect of the invention is a pin insertion jig that inserts the pins into the insertion holes of the ferrule in the above-mentioned optical connector. The pin insertion jig includes: pinching portions that pinch the pins; and ride-on portions that are provided outside the pinching portions and release the pinch of the pins simultaneously with the insertion of the pins by riding on the outside of the housing and opening the pinching portions at the time of the insertion of the pins.

An expansion member according to yet another aspect of the invention is an expansion member that expands retaining holes of a pin keeper retaining pins inserted into insertion holes of a ferrule of an optical connector. The pin keeper includes a pair of side portions in which the retaining holes are formed, and a bottom portion that connects end portions of the pair of side portions. The retaining holes are formed in a shape in which side surfaces of the side portions facing each other are notched. The optical connector includes a housing that receives the pin keeper. The expansion member further includes: a first projection portion that push and widen the pair of side portions and expands the retaining holes by being inserted from the first opening formed in the housing and coming into contact with the respective side portions.

A pin insertion tool according to another aspect of the invention is a pin insertion tool that inserts pins into the retaining holes expanded by the above-mentioned expansion member. The pin insertion tool includes a pin retaining portion that retains the pins, and a connecting portion that is connected to the expansion member. The pins are inserted into the retaining holes when the pin retaining portion is pushed against the expansion member in a state in which the pin insertion tool is connected to the expansion member by the connecting portion.

Advantageous Effects of Invention

According to the invention, pins can be attached to and detached from a ferrule.

BRIEF DESCRIPTION OF DRAWINGS

FIG. 5 is the pin keeper of FIG. 4, wherein FIG. 5(a) is a front view of the pin keeper and FIG. 5(b) is a cross-sectional view taken along line VB-VB.

FIG. 6 is an expansion member of the first embodiment, wherein FIG. 6(a) is a plan view of the expansion member and FIG. 6(b) is a cross-sectional view taken along line VIB-VIB.

FIG. 9 is a pin insertion jig, wherein FIG. 9(a) is a plan view of the pin insertion jig, FIG. 9(b) is a side view of the pin insertion jig and FIG. 9(c) is a cross-sectional view taken along line IXC-IXC.

FIG. 10 is the pin insertion jig of FIG. 9, wherein FIG. 10(a) is a plan view illustrating a state in which pins are not yet inserted using the pin insertion jig and FIG. 10(b) is a cross-sectional view taken along line XB-XB.

FIG. 11 is the pin insertion jig of FIG. 9, wherein FIG. 11(a) is a plan view illustrating a state in which pins are being inserted using the pin insertion jig and FIG. 11(b) is a cross-sectional view taken along line XIB-XIB.

FIG. 12 is the pin insertion jig of FIG. 9, wherein FIG. 12(a) is a plan view illustrating a state in which pins have been inserted using the pin insertion jig and FIG. 12(b) is a cross-sectional view taken along line XIIB-XIIB.

FIG. 14 is the pin keeper of FIG. 13, wherein FIG. 14(a) is a front view of the pin keeper, FIG. 14(b) is a plan view of the pin keeper and FIG. 14(c) is a bottom view of the pin keeper.

FIG. 17 is the expansion member, wherein FIG. 17(a) is a plan view of the expansion member and FIG. 17(b) is a side view of the expansion member.

FIG. 18 is a pin insertion tool, wherein FIG. 18(a) is a perspective view of the pin insertion tool and FIG. 18(b) is a perspective view of the pin insertion tool seen in another direction.

FIG. 19 is the pin insertion tool, wherein FIG. 19(a) is a side view of the pin insertion tool, FIG. 19(b) is a plan view of the pin insertion tool and FIG. 19(c) is a side view of the pin insertion tool seen in another direction.

DESCRIPTION OF EMBODIMENTS

[Description of Embodiment of Invention]

Figure 1:
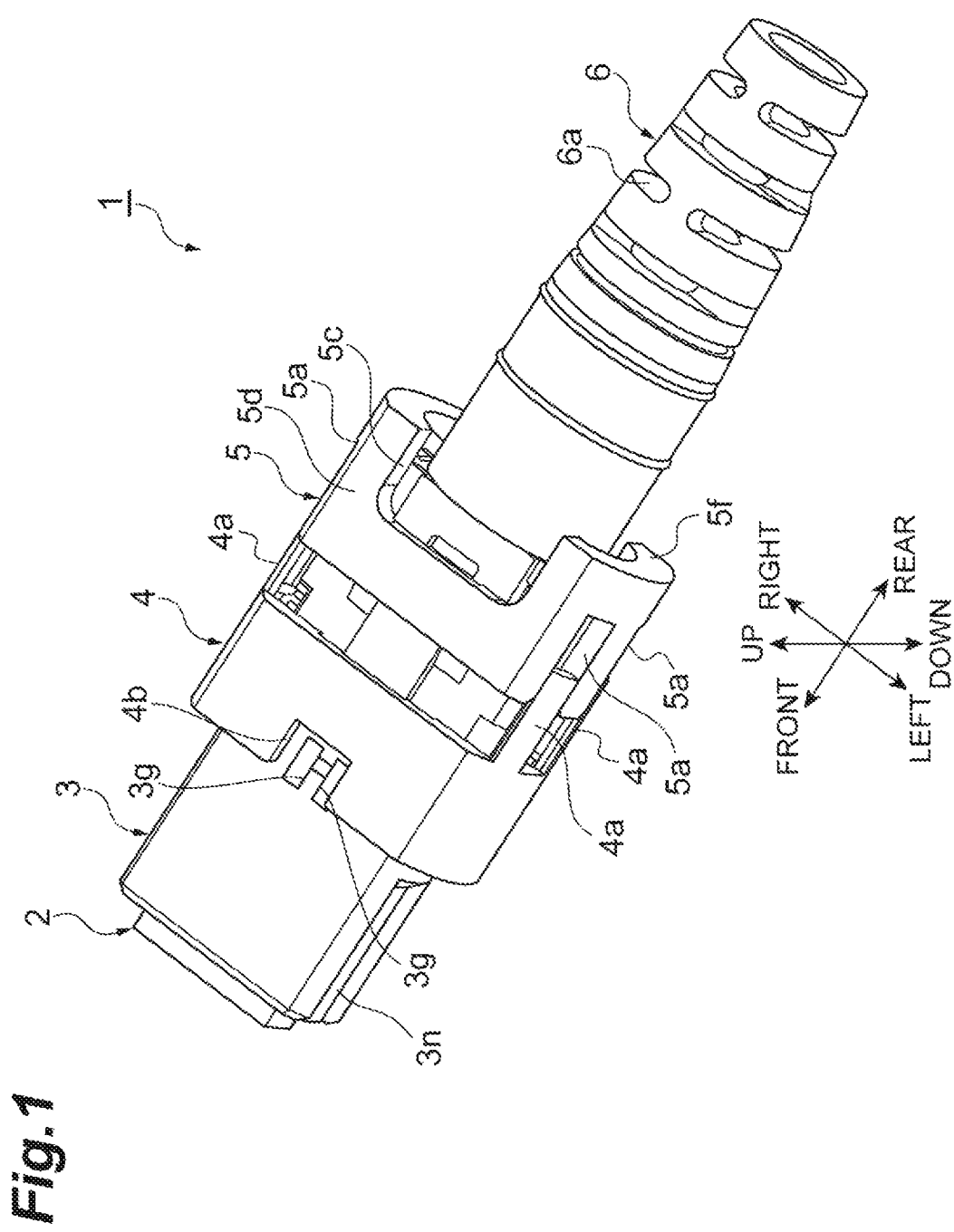
FIG. 1 is a perspective view of an optical connector according to a first embodiment.

First, the contents of embodiments of the invention will be listed and described. (1) An optical connector according to an aspect of the invention is an optical connector that is connected to another connector in a predetermined connection direction. The optical connector includes a ferrule that includes insertion holes into which pins to be connected to the another connector are to be inserted; and a pin keeper that is provided on a side of the ferrule opposite to the another connector and includes retaining holes retaining the pins inserted into the insertion holes. The pin keeper includes a pair of side portions in which the retaining holes are formed, and a bottom portion that connects end portions of the pair of side portions. The retaining holes are formed in a shape in which inside surfaces of the side portions facing each other are notched.

In the optical connector according to an aspect of the invention, the pin keeper includes two side portions and a bottom portion and the retaining holes are formed on the inside surfaces of the two side portions. The retaining holes are formed in a shape in which the inside surfaces of the side portions of the pin keeper are notched. Accordingly, when the two side portions are widened so as to be opened, the side portions are bent and the retaining holes are expanded. In this state, the pins can be inserted into the retaining holes. When the two side portions are widened so as to be opened as described above in a state in which the pins are inserted into the retaining holes and are retained, the retaining holes are widened. Accordingly, the pins can be pulled out of the retaining holes. When the two side portions are widened so as to be opened as described above, the pins can be retained and the retention of the pins can be released. Accordingly, the pins can be attached to and detached from the ferrule.

(2) In the optical connector, the thickness of a portion of the side portion, which is positioned outside the retaining hole, may be smaller than the thickness of the bottom portion. In this case, since a portion of the side portion positioned outside the retaining hole can be easily bent when the two side portions are widened so as to be opened, the retaining holes can be easily expanded. Accordingly, the pins can be easily inserted into and removed from the retaining holes of the pin keeper. Therefore, the pins can be easily attached to and detached from the ferrule.

(3) The optical connector may further include a housing that receives the ferrule and the pin keeper. The housing includes a first opening through which an expansion member widening the pair of side portions is inserted into the housing. The pair of side portions may be pushed to be widened when the expansion member is inserted from the first opening and comes into contact with the inside of each of the side portions. In this case, since the retaining holes are expanded when the expansion member is inserted into the housing from the first opening of the housing and the expansion member comes into contact with the inside of each of the side portions, the pins can be inserted into and removed from the retaining holes.

(4) In the optical connector, the expansion member may include a pressing portion that presses the pin keeper in the housing, and the housing may include a second opening through which the pressing portion is inserted into the housing and which is formed on a side of the housing opposite to the first opening. In this case, the retaining holes can be expanded by the expansion member in a state in which the pressing portion is inserted into the housing from the second opening and the pin keeper is pressed from the opposite side by the pressing portion. Since the pin keeper is pressed from the opposite side by the pressing portion at the time of the expansion of the retaining holes as described above, the movement of the pin keeper at the time of the expansion can be suppressed. Accordingly, the retaining holes can be expanded in a state in which the position of the pin keeper is stabilized. Therefore, the pins can be easily inserted into and removed from the retaining holes.

(5) The optical connector may further include an outer housing that covers at least a part of an outer peripheral portion of the housing. The outer housing may include an opening portion through which the first opening of the housing is exposed to the outside. In this case, the retaining holes can be expanded when the expansion member is inserted into the outer housing from the opening portion of the outer housing.

(6) The optical connector may further include an outer housing that covers at least a part of an outer peripheral portion of the housing. The outer housing may include an opening portion through which the second opening of the housing is exposed to the outside. In this case, the pin keeper can be pressed when the pressing portion is inserted into the outer housing from the opening portion of the outer housing.

(7) In the optical connector, the shape of the pin keeper seen from one side in the connection direction may be the same as the shape of the pin keeper seen from the other side in the connection direction. In a case in which the shape of the front surface of the pin keeper in the connection direction is the same as the shape of the rear surface of the pin keeper in the connection direction as described above, the pin keeper can be mounted on the optical connector without regard to the front and rear surfaces of the pin keeper. Accordingly, the pin keeper can be easily mounted.

(8) A pin keeper according to another aspect of the invention is a pin keeper provided in an optical connector that includes a ferrule including insertion holes into which pins to be connected to another connector are to be inserted and is connected to the another connector by the connection of the pins. The pin keeper includes: a pair of side portions in which retaining holes retaining the pins inserted into the insertion holes are formed; and a bottom portion that connects end portions of the pair of side portions. The retaining holes are formed in a shape in which inside surfaces of the side portions facing each other are notched.

The pin keeper according to another aspect of the invention includes two side portions and the bottom portion, and the retaining holes are formed on the inside surfaces of the two side portions. The retaining holes are formed in a shape in which the inside surfaces of the side portions of the pin keeper are notched. Accordingly, as in the above-mentioned optical connector, the side portions are bent and the retaining holes are expanded when the two side portions are widened so as to be opened. In this state, the pins can be inserted into and removed from the retaining holes. Therefore, the pins can be attached to and detached from the ferrule.

(9) A pin insertion jig according to still another aspect of the invention is a pin insertion jig that inserts the pins into the insertion holes of the ferrule in the above-mentioned optical connector. The pin insertion jig includes: pinching portions that pinch the pins; and ride-on portions that are provided outside the pinching portions and release the pinch of the pins simultaneously with the insertion of the pins by riding on the outside of the housing and opening the pinching portions at the time of the insertion of the pins.

The pin insertion jig according to still another aspect of the invention includes pinching portions that pinch the pins; and ride-on portions that release the pinch of the pins by riding on the housing at the time of the insertion of the pins. Accordingly, the ride-on portions release the pinch of the pins by riding on the outside of the housing at the time of the insertion of the pins. Therefore, the pins can be smoothly inserted.

(10) An expansion member according to yet another aspect of the invention is an expansion member that expands retaining holes of a pin keeper retaining pins inserted into insertion holes of a ferrule of an optical connector. The pin keeper includes a pair of side portions in which the retaining holes are formed, and a bottom portion that connects end portions of the pair of side portions. The retaining holes are formed in a shape in which side surfaces of the side portions facing each other are notched. The optical connector includes a housing that receives the pin keeper. The expansion member further includes: a first projection portion that push and widen the pair of side portions and expands the retaining holes by being inserted from the first opening formed in the housing and coming into contact with the respective side portions.

In the expansion member, the first projection portion expands the retaining holes of the pin keeper by pushing and widening the pair of side portions. Accordingly, when the pins are inserted into the expanded retaining holes of the pin keeper, the pins can be retained by the retaining holes. Therefore, since the pins are inserted into the insertion holes of the ferrule of the optical connector and the inserted pins are retained by the retaining holes, the pins can be mounted on the optical connector. Since the pins, which are retained by the retaining holes, are pulled out of the retaining holes after the retaining holes are expanded by the expansion member, the pins can be removed from the retaining holes. Accordingly, the pins are pulled out in a state in which the retaining holes are expanded, and the pins are removed from the insertion holes of the ferrule. Therefore, the pins can be removed from the optical connector. As described above, the pins can be attached to and detached from the ferrule of the optical connector.

(11) The expansion member may further include a second projection portion that is inserted from a second opening positioned on a side of the housing opposite to the first opening, and the second projection portion may press the pin keeper in the housing by coming into contact with the bottom portion. Since the second projection portion presses the pin keeper by coming into contact with the bottom portion of the pin keeper as described above, the movement of the pin keeper at the time of the expansion of the retaining holes can be suppressed. Accordingly, the retaining holes can be expanded in a state in which the position of the pin keeper is stabilized. Therefore, the pins can be easily attached to and detached from the retaining holes.

(12) The expansion member may further include a placement portion on which the housing is placed so that the second projection portion is inserted into the second opening, and the placement portion may be provided with a convex portion that is inserted into a concave portion formed on the outer surface of the housing. In this case, when the housing is placed on the placement portion, the convex portion of the placement portion is inserted into the concave portion of the housing and the second projection portion is inserted into the second opening. Accordingly, since the housing can be stabilized on the placement portion, the second projection portion is inserted in a state in which the housing is stabilized. Therefore, since the pin keeper can be stably pressed by the second projection portion, the pins can be more easily attached to and detached from the retaining holes.

(13) A pin insertion tool according to another aspect of the invention is a pin insertion tool that inserts pins into the retaining holes expanded by the above-mentioned expansion member. The pin insertion tool includes a pin retaining portion that retains the pins, and a connecting portion that is connected to the expansion member. The pins are inserted into the retaining holes when the pin retaining portion is pushed against the expansion member in a state in which the pin insertion tool is connected to the expansion member by the connecting portion.

In the pin insertion tool, the pins are inserted into the retaining holes in a state in which the retaining holes of the pin keeper are expanded by the above-mentioned expansion member. The pin insertion tool is connected to the expansion member by the connecting portion, and the pins are inserted into the retaining holes in this state. Accordingly, the pins can be stably inserted. Therefore, since the pins can be smoothly inserted into the retaining holes, the pins can be easily mounted on the optical connector.

(14) In the pin insertion tool, the connecting portion may be formed in the shape of a rod that protrudes in a direction in which the pin extends, and may be connected to the expansion member by being inserted into a hole portion formed in the expansion member. In this case, the pin insertion tool can be easily connected to the expansion member by only the insertion of the rod-like connecting portion into the hole portion. Therefore, the pins can be more smoothly inserted into the retaining holes.

[Detail of Embodiment of Invention]

Specific examples of an optical connector, a pin keeper, a pin insertion jig, an expansion member, and a pin insertion tool according to embodiments of the invention will be described with reference to the drawings. Meanwhile, the invention is not limited to the illustration of these specific examples, is defined by claims, and intends to include all modifications in the scope equivalent to claims. In the following description, the same elements are denoted by the same reference numerals in the description of the drawings and the repeated description thereof will be omitted.

(First Embodiment)

Figure 2:
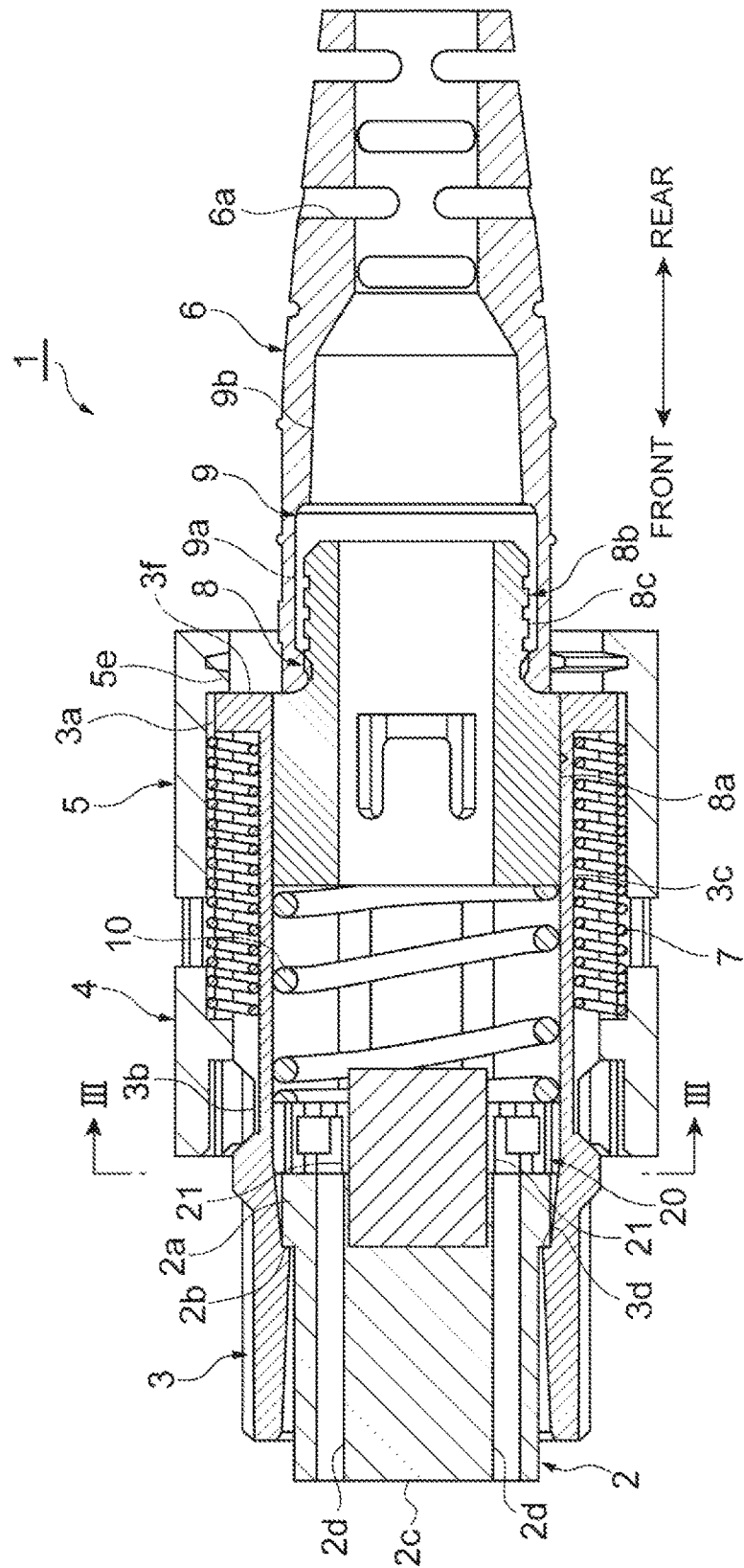
FIG. 2 is a longitudinal sectional view of the optical connector of FIG. 1.

FIG. 1 is a perspective view of an optical connector 1 according to this embodiment. FIG. 2 is a longitudinal sectional view of the optical connector 1. The optical connector 1 is, for example, a MPO connector. The optical connector 1 is a connector that is to be connected to an external optical adapter.

As illustrated in FIGS. 1 and 2, the optical connector 1 includes a rectangular ferrule 2, an inner housing (housing) 3, a first outer housing (outer housing) 4 and a second outer housing 5, and a boot 6, as components forming the appearance thereof. The rectangular ferrule 2 is positioned at one end of the optical connector 1, the inner housing 3 covers the ferrule 2, the first outer housing 4 and the second outer housing 5 cover a part of the inner housing 3, and the boot 6 is connected to the inner housing 3. Coil springs 7, a rear housing 8, a caulking ring 9, a ferrule spring 10, and a pin keeper 20 are provided in the optical connector 1.

For the convenience of the description, directions of "front", "rear", "upper", "lower", "left", and "right" will be defined and description will be made below. A direction in which the inner housing 3 and the boot 6 are connected to each other is referred to as a front-rear direction, that is, a direction in which the inner housing 3 is seen from the boot 6 corresponds to the front and an opposite direction thereof corresponds to the rear. The longitudinal direction of the front surface of the ferrule 2 is referred to as a left-right direction, and the short direction of the front surface of the ferrule 2 is referred to as a vertical direction. These directions are merely for the convenience of the description, and do not limit the scope of the invention.

The ferrule 2 is formed in the shape of a box that includes an expansion portion 2a at the rear portion thereof. A plurality of fiber holes, which extend in the front-rear direction, are formed in the ferrule 2. Each of optical fibers of a fiber cord, which is to be inserted from the rear side of the boot 6, is inserted into each of the fiber holes. A front surface 2b of the expansion portion 2a serves as a contact surface that is in contact with the inner housing 3.

The ferrule 2 includes a connection surface 2c that comes into contact with another connector when the ferrule (hereinafter, referred to as a mating ferrule) of another connector is connected to the optical connector 1, and two insertion holes 2d into which two guide pins P (see FIG. 10) positioning the mating ferrule are to be inserted. The guide pins P and the insertion holes 2d function as a positioning unit that positions the mating ferrule. The two insertion holes 2d are disposed so as to be arranged in the left-right direction.

A ferrule spring 10 that biases the ferrule 2 forward and a pin keeper 20 that retains the guide pins P inserted into the insertion holes 2d from the front side are provided between the ferrule 2 and the rear housing 8. The pin keeper 20 is received in the inner housing 3, and is provided on the rear side of the ferrule 2 and on the front side of the ferrule spring 10. The pin keeper 20 includes two retaining holes 21 that retain the guide pins P, and the two retaining holes 21 are provided so as to be arranged in the left-right direction. The structure of the pin keeper 20 will be described in detail below.

The inner housing 3 is formed in the shape of a stepped square cylinder that includes an expansion portion 3a at the rear portion thereof. A pair of left and right engagement holes 3b with which latches of an external optical adapter are engaged and grooves 3c that receive the coil springs 7 for biasing the first outer housing 4 forward are provided on the outer surface of the inner housing 3. The engagement holes 3b are provided on the surface of the inner housing 3. For example, the engagement holes 3b are formed in a trapezoidal shape on the outer surface of the inner housing 3. When the latches of the optical adapter are fitted to the respective engagement holes 3b, the optical connector 1 is engaged with the optical adapter in the front-rear direction and the optical connector 1 is mounted on the optical adapter. The grooves 3c extend in the front-rear direction. The coil springs 7, which are stretchable in the front-rear direction, are received in the grooves 3c.

The ferrule 2 and the front portion of the rear housing 8 are received in the inner housing 3. The inside surface of the inner housing 3 is formed in a stepped shape. A contact surface 3d with which the ferrule 2 is in contact is provided in the inner housing 3. The front surface 2b of the expansion portion 2a, which is biased forward by the ferrule spring 10, is in contact with the contact surface 3d.

The first outer housing 4 is mounted on the outside of the inner housing 3 so as to be movable in the front-rear direction. The first outer housing 4 is formed in a cylindrical shape. The cross-section of the first outer housing 4 is formed in a shape where the short sides of a rectangle are curved so as to swell to the outside. The rear portion of the first outer housing 4 is provided with four claw portions 4a that are engaged with the second outer housing 5. Each of the claw portions 4a is formed so as to extend rearward by a predetermined length. The first outer housing 4 includes a pair of upper and lower claw portions 4a on the left side thereof, and also includes a pair of upper and lower claw portions 4a on the right side thereof.

The second outer housing 5 is provided on the rear side of the first outer housing 4 and is movable relative to the first outer housing 4 in the front-rear direction. The second outer housing 5 is formed separately from the first outer housing 4. The second outer housing 5 is formed in a cylindrical shape. The cross-section of the second outer housing 5 is formed in a shape where the short sides of a rectangle are curved so as to swell to the outside. The cross-section of the second outer housing 5 can be set to, for example, the same shape as the cross-section of the first outer housing 4.

The front end portion of the boot 6 and the rear housing 8 are received in the second outer housing 5. The second outer housing 5 includes four slits 5a with which the claw portions 4a of the first outer housing 4 are engaged. Each of the slits 5a extends rearward from the front end of the second outer housing 5 by a predetermined length.

The second outer housing 5 includes a pair of upper and lower slits 5a on the left side thereof, and also includes a pair of upper and lower slits 5a on the right side thereof.

The second outer housing 5 includes notched portions 5c into which the front end portion of the boot 6 is to be inserted. For example, a pair of upper and lower notched portions 5c is provided. The notched portions 5c are formed so as to be notched forward from a rear end face 5f of the second outer housing 5. Flat side surfaces 5d of the second outer housing 5 where the notched portions 5c are formed are formed in a C shape where the outside is angulated.

A stepped portion 5e with which a rear end 3f of the inner housing 3 is in contact from the front side is provided in the second outer housing 5. The stepped portion 5e protrudes inward from the inner surface of the second outer housing 5. When the second outer housing 5 is moved forward and the front surface of the stepped portion 5e comes into contact with the rear end 3f of the inner housing 3 from the rear side, the second outer housing 5 and the inner housing 3 are moved forward together.

The rear housing 8 includes a cylindrical insertion portion 8a that is inserted into the rear portion of the inner housing 3, and a cylindrical portion 8b that is engaged with the caulking ring 9 on the rear side of the insertion portion 8a. The insertion portion 8a is formed so as to be expanded at the front end of the cylindrical portion 8b. The rear housing 8 is engaged with the inner housing 3 in a state in which the front end of the insertion portion 8a is in contact with the inner housing 3. An uneven portion 8c is formed on the outer peripheral surface of the cylindrical portion 8b of the rear housing 8.

The caulking ring 9 is formed in the shape of a stepped cylinder of which the diameter of the front portion is increased. The diameter of the caulking ring 9 is increased stepwise from the rear side to the front side. The caulking ring 9 includes a large-diameter portion 9a that is positioned on the front side of the caulking ring 9 and a small-diameter portion 9b that is positioned on the rear side of the large-diameter portion 9a. The caulking ring 9 is engaged with the rear housing 8 in the front-rear direction. Tensile-strength fibers of an optical fiber cord, an outer cover, and the like are interposed and fixed between the outer peripheral surface of the cylindrical portion 8b and the inner peripheral surface of the caulking ring 9. Each of the optical fibers of the optical fiber cord is retained in the caulking ring 9.

The boot 6 is formed in the shape of a cylinder extending in the front-rear direction. The boot 6 is mounted on the caulking ring 9 in a state in which the boot 6 receives the cylindrical portion 8b of the rear housing 8 and the caulking ring 9. The boot 6 protects the optical fiber cord so that the optical fiber cord is not bent sharply. The front end of the boot 6 is in contact with the rear end of the insertion portion 8a of the rear housing 8, and the boot 6 extends rearward from this contact portion. The diameter of the boot 6 is gradually reduced toward the rear side on the rear side of a portion of the boot 6 that receives the caulking ring 9. A plurality of slot-shaped through holes 6a, which extend in the circumferential direction of the boot 6, are formed at the rear portion of the boot 6 of which the diameter is reduced.

Incidentally, in the above-mentioned optical connector, a transmission rate exceeds 10 Gbps and transmission rates of 40 Gbps and 100 Gbps are realized as a demand for communication is increased. Accordingly, the upgrade of a transmission rate to 40 Gbps or 100 Gbps from 10 Gbps is desired. Here, in the optical connector, a state in which the guide pins protrude from the connection surface of the ferrule is male and a state in which the insertion holes are exposed to the connection surface is female. In the optical connector, there is a case in which the switching between a male connector and a female connector should be performed according to the upgrade.

Accordingly, a state in which the guide pins P protrude from the connection surface 2c and a state in which the insertion holes 2d are exposed to the connection surface 2c can be switched in the optical connector 1 according to this embodiment. In the optical connector 1, the switching between a male connector and a female connector can be freely performed without the separation of the optical connector or the removal of the optical connector from the optical fiber cord. This switching is realized by the insertion/removal of the guide pins P into/from the ferrule 2 and the pin keeper 20. The ferrule 2, the pin keeper 20, and the peripheral structure thereof will be described in detail below.

Figure 3:
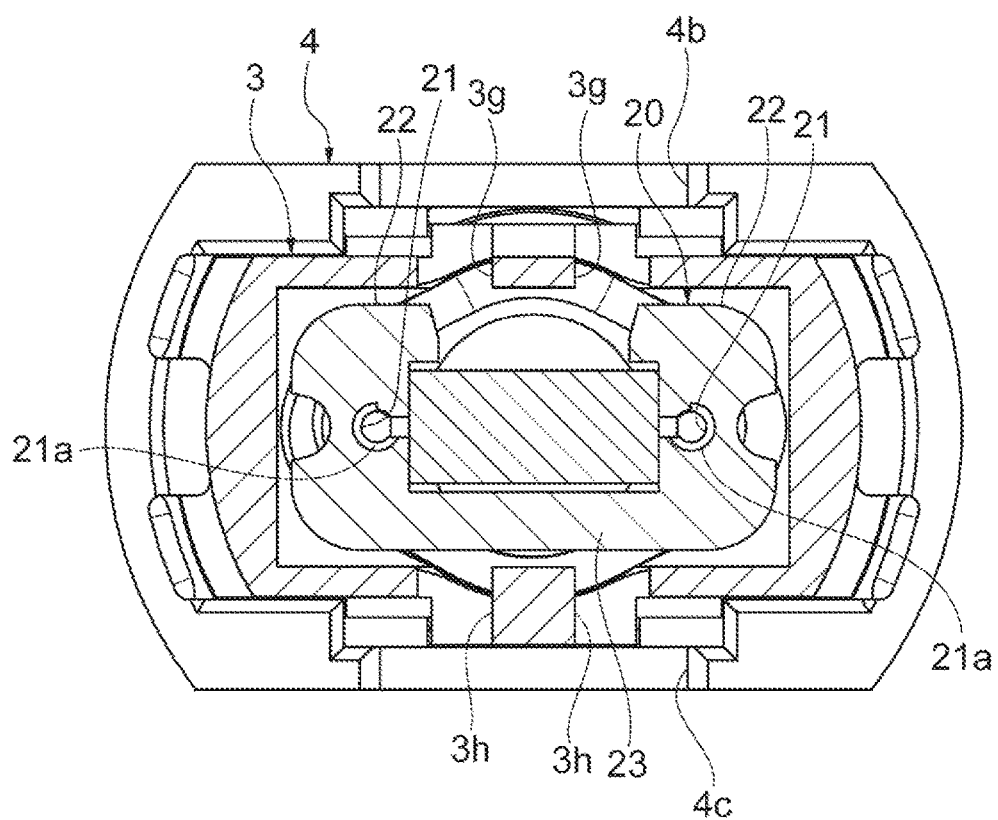
FIG. 3 is a cross-sectional view taken along line III-III of FIG. 2.
Figure 4:
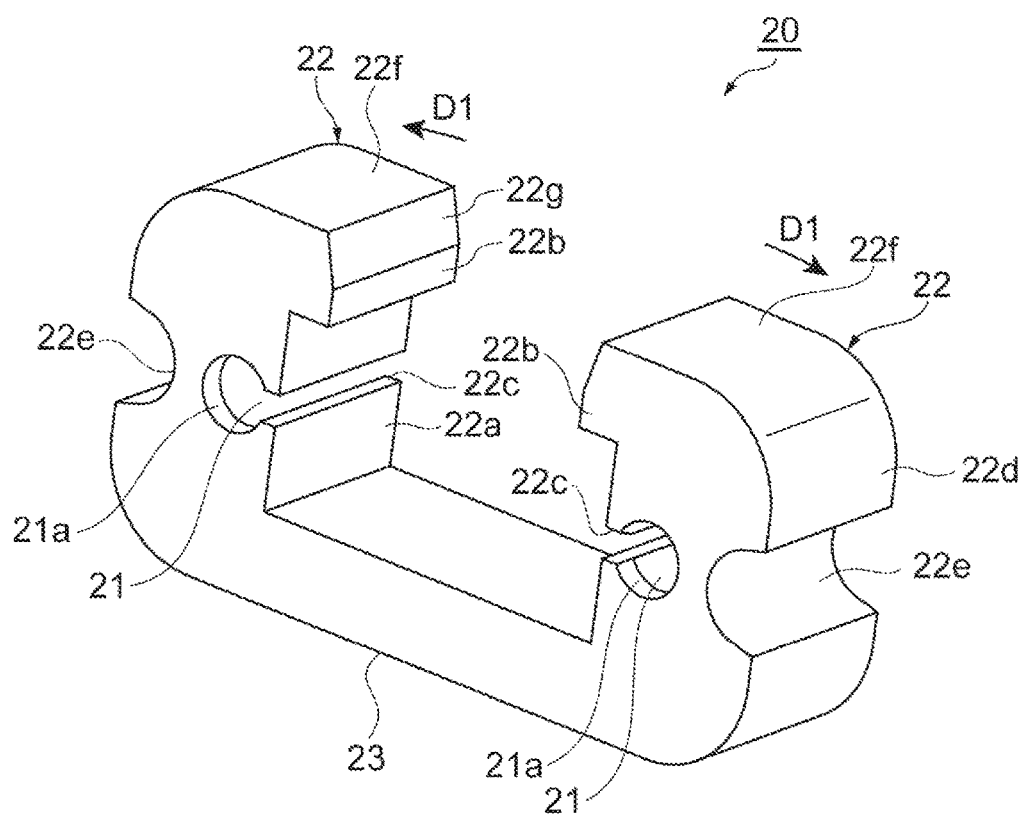
FIG. 4 is a perspective view of a pin keeper according to the first embodiment.

As illustrated in FIGS. 3 and 4, the pin keeper 20 according to this embodiment is formed in a U shape. The pin keeper 20 includes a pair of side portions 22 that is arranged in parallel to each other, and a bottom portion 23 that connects end portions of the pair of side portions 22. The above-mentioned retaining holes 21 are formed in a shape in which inside surfaces 22a of the side portions 22 facing each other are notched. Tapered surfaces 21a are provided at inlet-side end portions and outlet-side end portions of the retaining holes 21. The guide pins P can be smoothly inserted into the retaining holes 21 by the tapered surfaces 21a.

The pair of side portions 22 can be opened by being bent in a direction D1 in which the side portions 22 are separated from each other by an expansion member 30 (see FIG. 6) to be described below. A notch (opening portion) 4b into which the expansion member 30 is to be inserted is formed at the first outer housing 4. Two first openings 3g into which the expansion member 30 is to be inserted are formed at the inner housing 3. The same notch (opening portion) 4c as the notch 4b is formed on the side of the first outer housing 4 opposite to the notch 4b. Two second openings 3h into which pressing portions 31 of the expansion member 30 are to be inserted are formed on the side of the inner housing 3 opposite to the first openings 3g.

As illustrated in FIGS. 4 and 5, the pin keeper 20 is formed in a shape where the front surface and the rear surface are symmetrical to each other. When the pin keeper 20 is mounted on the optical connector 1, the shape of the pin keeper 20 seen from the front side is the same as the shape of the pin keeper 20 seen from the rear side. Each of the side portions 22 includes a protruding portion 22b that protrudes toward the inside of the pin keeper 20 at an end portion of the side portion 22 opposite to the bottom portion 23, a notched portion 22c that is formed on the inside surface 22a, and a concave portion 22e that is formed on an outside surface 22d of the side portion 22.

The protruding portion 22b includes a tapered surface 22g that is inclined toward the inside of the pin keeper 20 from an upper end face 22f of the side portion 22. When the expansion member 30 comes into contact with the tapered surfaces 22g from the upper side, the pair of side portions 22 is widened in the direction D1. The above-mentioned retaining hole 21 is formed in each of the notched portions 22c of the side portions 22. When the pair of side portions 22 is widened in the direction D1, the upper portions of the side portions 22 are bent and the notched portions 22c are widened. Accordingly, the retaining holes 21 are also widened.

The concave portion 22e formed on the outside surface 22d is formed outside the retaining hole 21. Since the concave portion 22e, the retaining hole 21, and the notched portion 22c are arranged in a lateral direction, a constricted portion is formed at a portion of the side portion 22 positioned outside the retaining hole 21. The thickness T1 of the constricted portion is smaller than the thickness T2 of the bottom portion 23.

Figure 6:
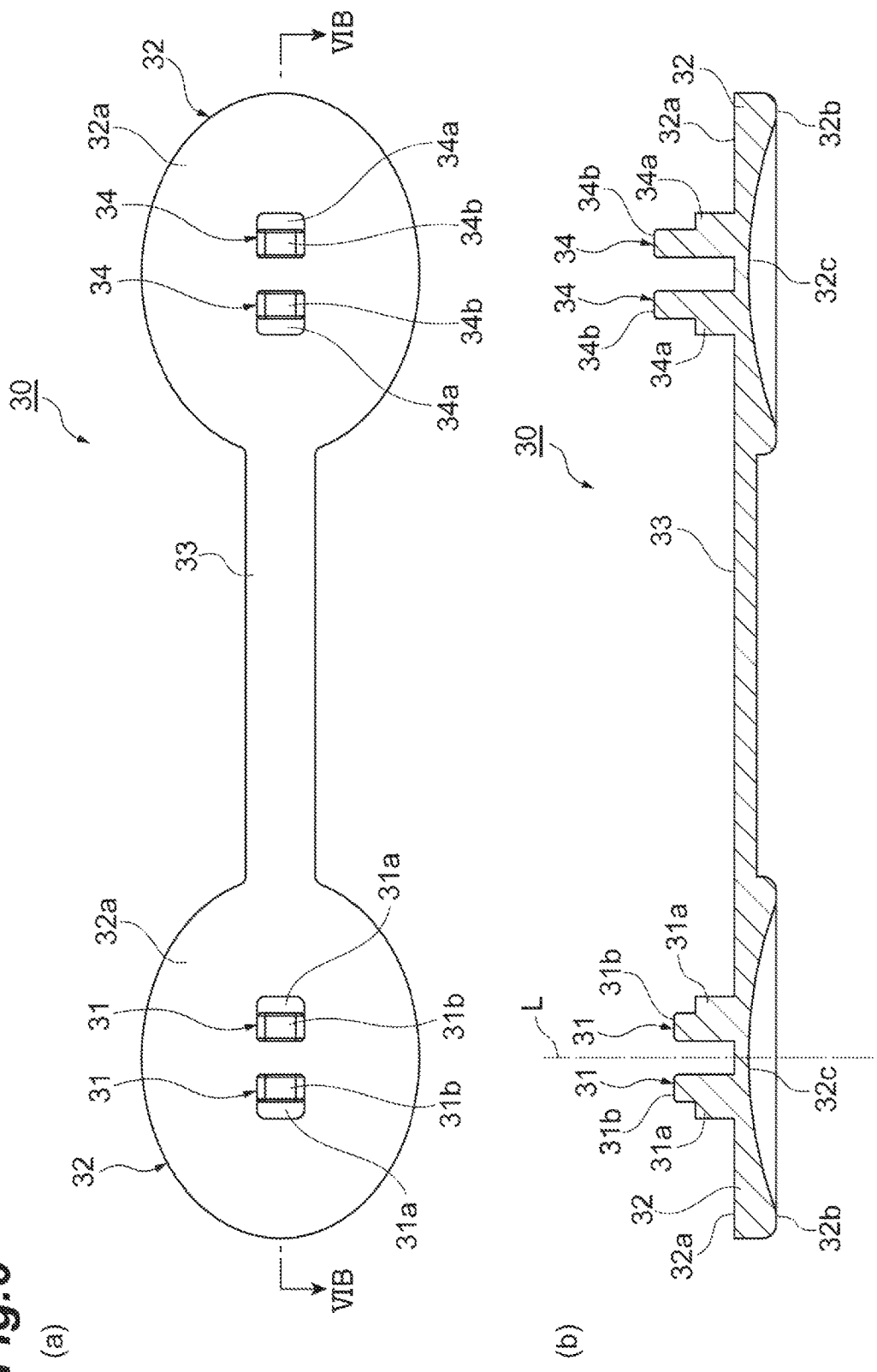

Next, the expansion member 30, which widens the pair of side portions 22 in the direction D1, will be described with reference to FIG. 6. As illustrated in FIG. 6, the expansion member 30 includes two oval first bases 32, a linear second base 33 that connects the two first bases 32, and two expansion portions 34 that are provided on one first base of the two first bases 32, in addition to the above-mentioned pressing portions 31.

The two pressing portions 31 are provided on the other first base of the two first bases 32. The expansion member 30 is made of a flexible material. The second base 33 is formed to be narrower than the first base 32. The second base 33 is formed to be thinner than the first base 32. Accordingly, when the second base 33 is bent so that the pressing portions 31 and the expansion portions 34 face each other, the expansion member 30 can be bent in a U shape.

Each of the pressing portions 31 includes a lower step portion 31a that is connected to the first base 32 and an upper step portion 31b that is positioned at an upper portion of the lower step portion 31a. The pressing portion 31 is formed stepwise by the lower step portion 31a and the upper step portion 31b. The two pressing portions 31 are disposed so as to be symmetrical with respect to a reference line L orthogonal to the first bases 32.

Each of the first bases 32 includes a first surface 32a on which the pressing portions 31 or the expansion portions 34 are provided and a second surface 32b that is positioned on the side opposite to the first surface 32a, A concave portion 32c, which is dented in a curved shape, is formed on each of the second surfaces 32b. The expansion member 30 is formed in a shape, which is easy to hold, by the concave portions 32c. A user can easily bent the second base 33 in a U shape by allowing, for example, two fingers to come into contact with the respective concave portions 32c.

Each of the expansion portions 34 includes a lower step portion 34a and an upper step portion 34b as in the case of the pressing portion 31. The expansion portion 34 is formed stepwise. The height of the lower step portion 34a from the first surface 32a of the first base 32 is substantially the same as the height of the lower step portion 31a of the pressing portion 31. The height of the upper step portion 34b from the first surface 32a is higher than the height of the upper step portion 31b of the pressing portion 31. Accordingly, the expansion portions 34 can be more deeply inserted into the first outer housing 4 and the inner housing 3.

Figure 7:
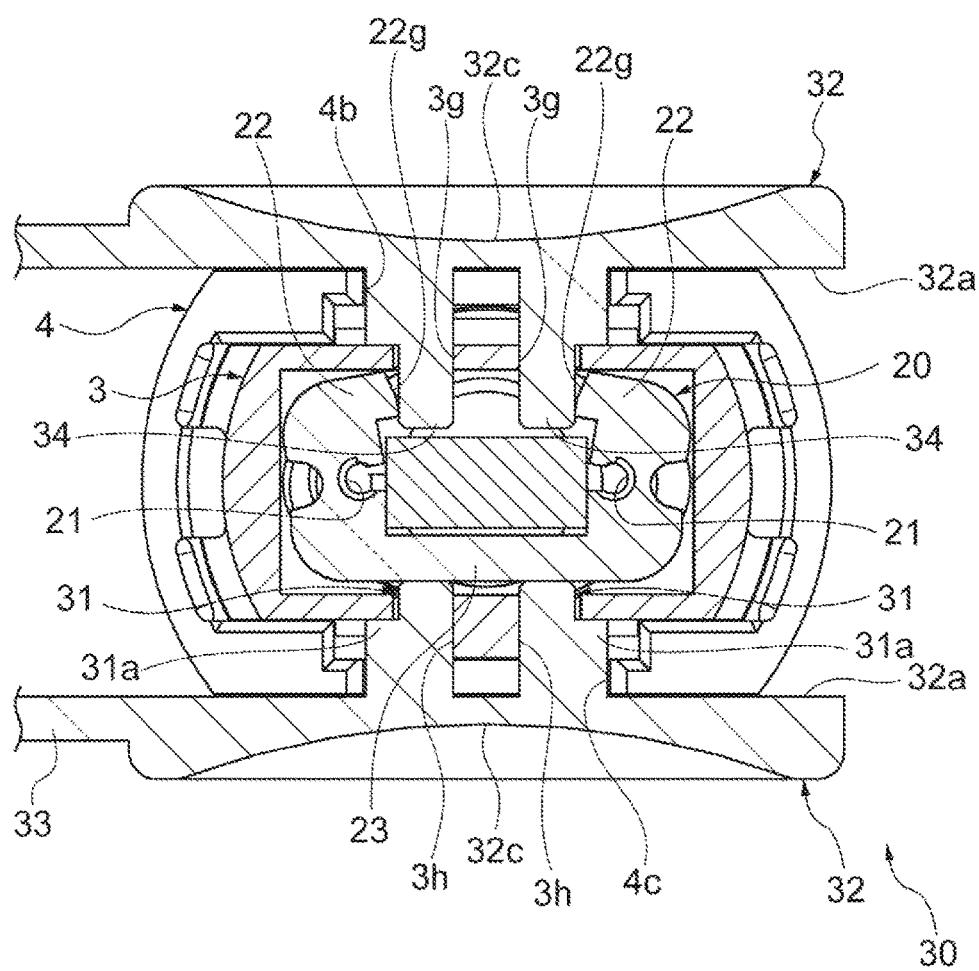
FIG. 7 is a cross-sectional view illustrating a state in which a space between side portions of the pin keepers is expanded by the expansion member.
Figure 8:
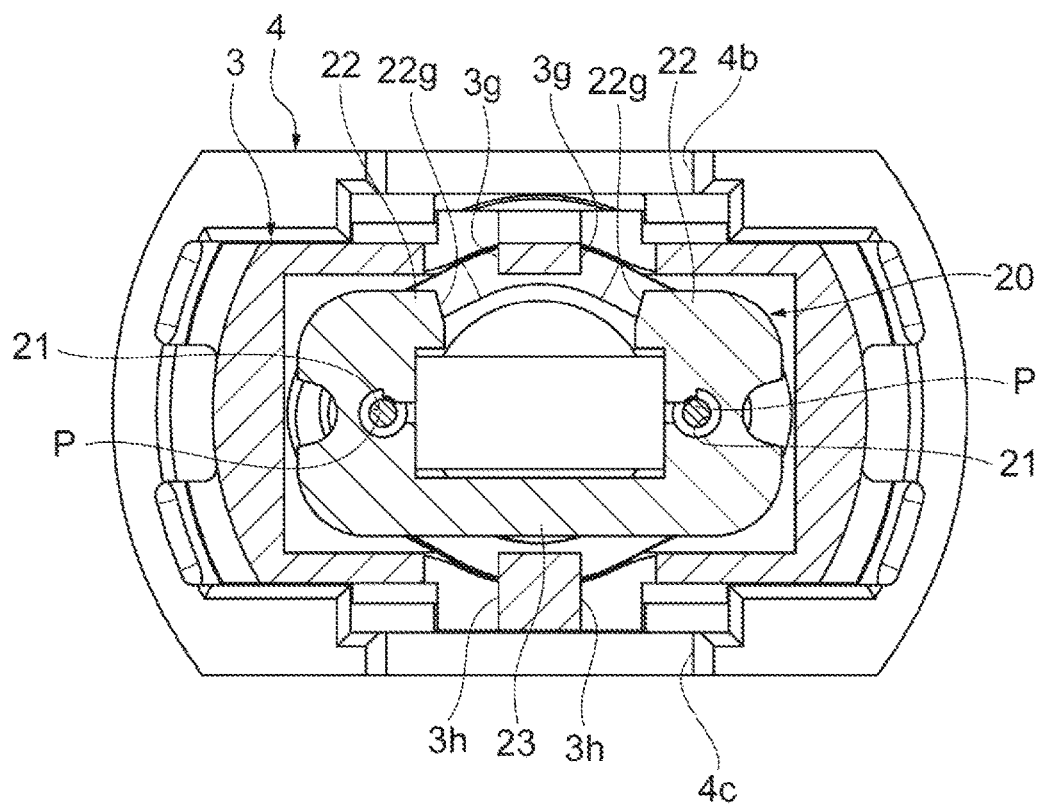
FIG. 8 is a cross-sectional view illustrating a state in which pins are inserted into a ferrule.

A method of inserting the guide pins P into the pin keeper 20 by using the expansion member 30 having the above-mentioned structure will be described with reference to FIGS. 7 and 8. FIG. 7 illustrates a state in which the retaining holes 21 are widened, and FIG. 8 illustrates a state in which the guide pins P have been inserted into the widened retaining holes 21.

As illustrated in FIG. 7, the pressing portions 31 of the expansion member 30 are inserted into the notch 4c of the first outer housing 4 and the second openings 3h of the inner housing 3. When the pressing portions 31 are inserted into the first outer housing 4 and the inner housing 3, the pressing portions 31 press the pin keeper 20 in the inner housing 3. The top faces of the lower step portions 31a of the pressing portions 31 come into contact with the surface of the inner housing 3 at the time of the insertion of the pressing portions 31. Since the pressing portions 31 are formed so as to have a two-step structure and the top faces of the lower step portions 31a come into contact with the surface of the inner housing 3, the excessive insertion of the pressing portions 31 can be prevented.

In a state in which the pressing portions 31 are inserted, the expansion member 30 is bent in a U shape and the expansion portions 34 of the expansion member 30 are inserted into the notch 4b of the first outer housing 4 and the first openings 3g of the inner housing 3. First, the expansion portions 34 come into contact with the tapered surfaces 22g of the side portions 22 of the pin keeper 20. When the expansion portions 34 are further inserted, the expansion portions 34 go over the tapered surfaces 22g and the respective side portions 22 are pushed to be bent and widened. Since the side portions 22 are pushed to be bent and widened as described above, the retaining holes 21 are expanded. In this state, the guide pins P are inserted into the retaining holes 21 as illustrated in FIG. 8.

The insertion of the guide pins P into the retaining holes 21 is performed using a pin insertion jig 40 illustrated in FIG. 9 The pin insertion jig 40 will be described below. The pin insertion jig 40 includes a rectangular body portion 41, four aim portions 42 that extend from the body portion 41 in the same direction, pinching portions 43 that protrude inward at end portions of the arm portions 42, and ride-on portions 44 that are positioned at ends of the respective arm portions 42.

The body portion 41 includes holes 41a into which the guide pins P are to be preliminarily inserted. The holes 41a are formed so as to be recessed in a direction opposite to the direction in which the arm portions 42 extend. When the guide pins P are inserted into the holes 41a, the guide pins P extend in the same direction as the arm portions 42.

Among the four arm portions 42, two arm portions 42 extend from an upper surface 41b of the body portion 41. The other two arm portions 42 extend from a lower surface 41c of the body portion 41. The positions of the two arm portions 42, which extend from the upper surface 41b, in plan view correspond to the positions of the two arm portions 42, which extend from the lower surface 41c, in plan view. A distance K1 between the two arm portions 42 corresponds to a distance between the two insertion holes 2d of the ferrule 2.

The pinching portions 43 are formed so as to protrude inward from the pairs of upper and lower arm portions 42, respectively. A distance K2 between ends of each of the pairs of pinching portions 43 is set to be slightly shorter than the outer diameter of the guide pin P. Accordingly, since each guide pin P can be pinched between the ends of each of the pairs of pinching portions 43, the guide pins P inserted into the holes 41a of the body portion 41 can be retained by the pinching portions 43. A concave portion P1 (see FIG. 10) is formed on the surface of each guide pin P, and the concave portion P1 can be pinched by the pinching portions 43. As described above, the guide pins P are formed in a shape that is easy to pinch.

The ride-on portions 44 are provided outside the pinching portions 43. Each of the ride-on portions 44 includes a tapered surface 44a that extends obliquely inward at the end of each of the arm portions 42, an apex portion 44b that is positioned at the end of each of the ride-on portions 44 and is rounded, and a tapered surface 44c that extends obliquely toward the pinching portion 43 from the apex portion 44b. A distance K3 between the apex portions 44b, which are arranged in the vertical direction, is set to be slightly longer than the height of the inner housing 3 in the vertical direction.

Figure 10:
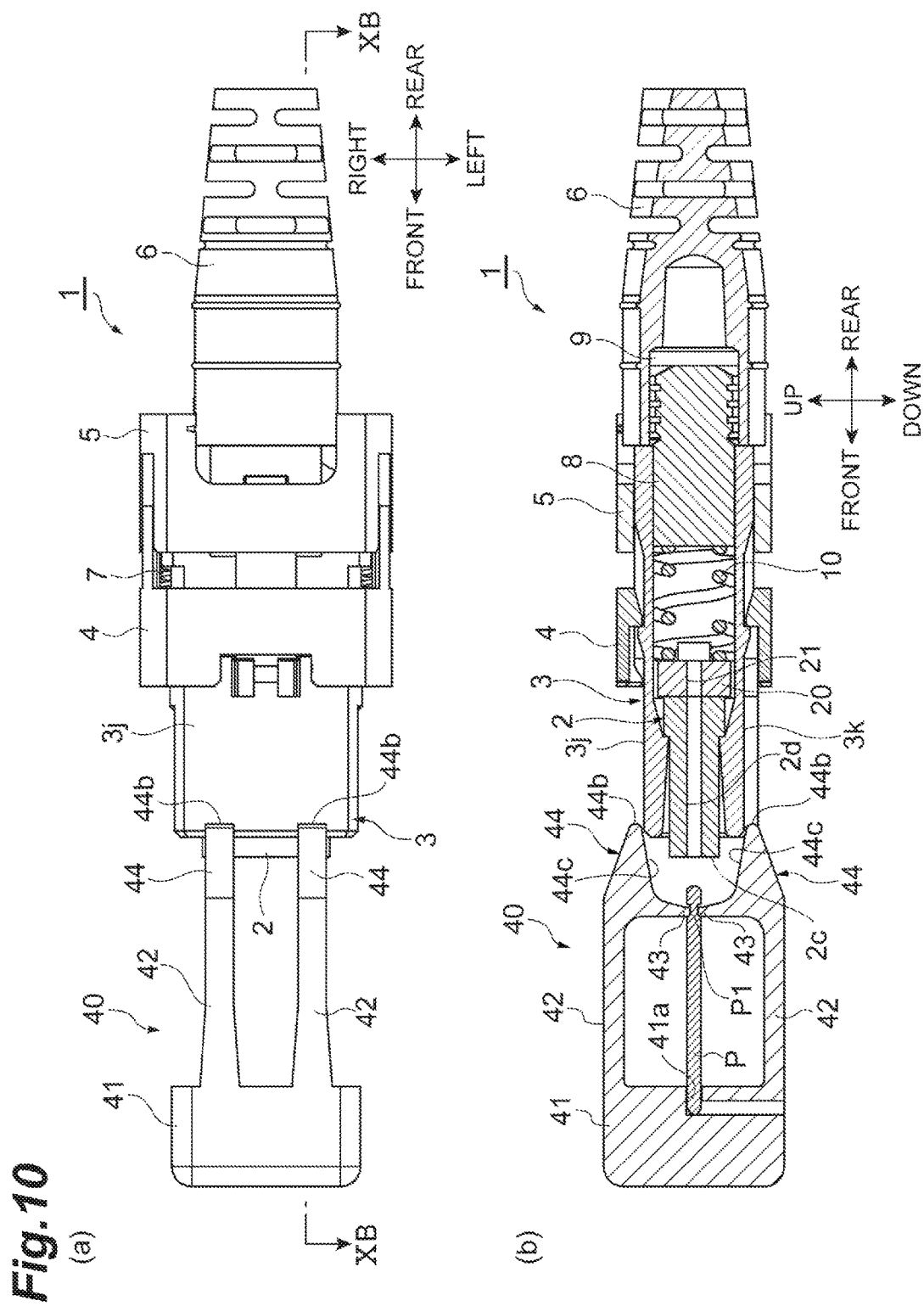

Next, a method of inserting the guide pins P into the insertion holes 2d of the ferrule 2 by using the pin insertion jig 40 will be described with reference to FIGS. 10 to 12. First, as illustrated in FIG. 10, the guide pins P are inserted into the holes 41a from the rear side and the guide pins P are vertically pinched by the pinching portions 43. Then, the apex portions 44b are made to ride on an upper surface 3j and a lower surface 3k of the inner housing 3. In this state, the vertical positions of the guide pins P correspond to the vertical positions of the insertion holes 2d.

When the pin insertion jig 40 is pushed against the inner housing 3 to the rear side in a state in which the apex portions 44b are made to ride on, the tapered surfaces 44c of the ride-on portions 44 ride on the upper surface 3j and the lower surface 3k, respectively. When the pin insertion jig 40 continues to be pushed, the pinch of the guide pins P performed by the pinching portions 43 is released. Then, the guide pins P start to be inserted into the insertion holes 2d from the front side.

Figure 11:
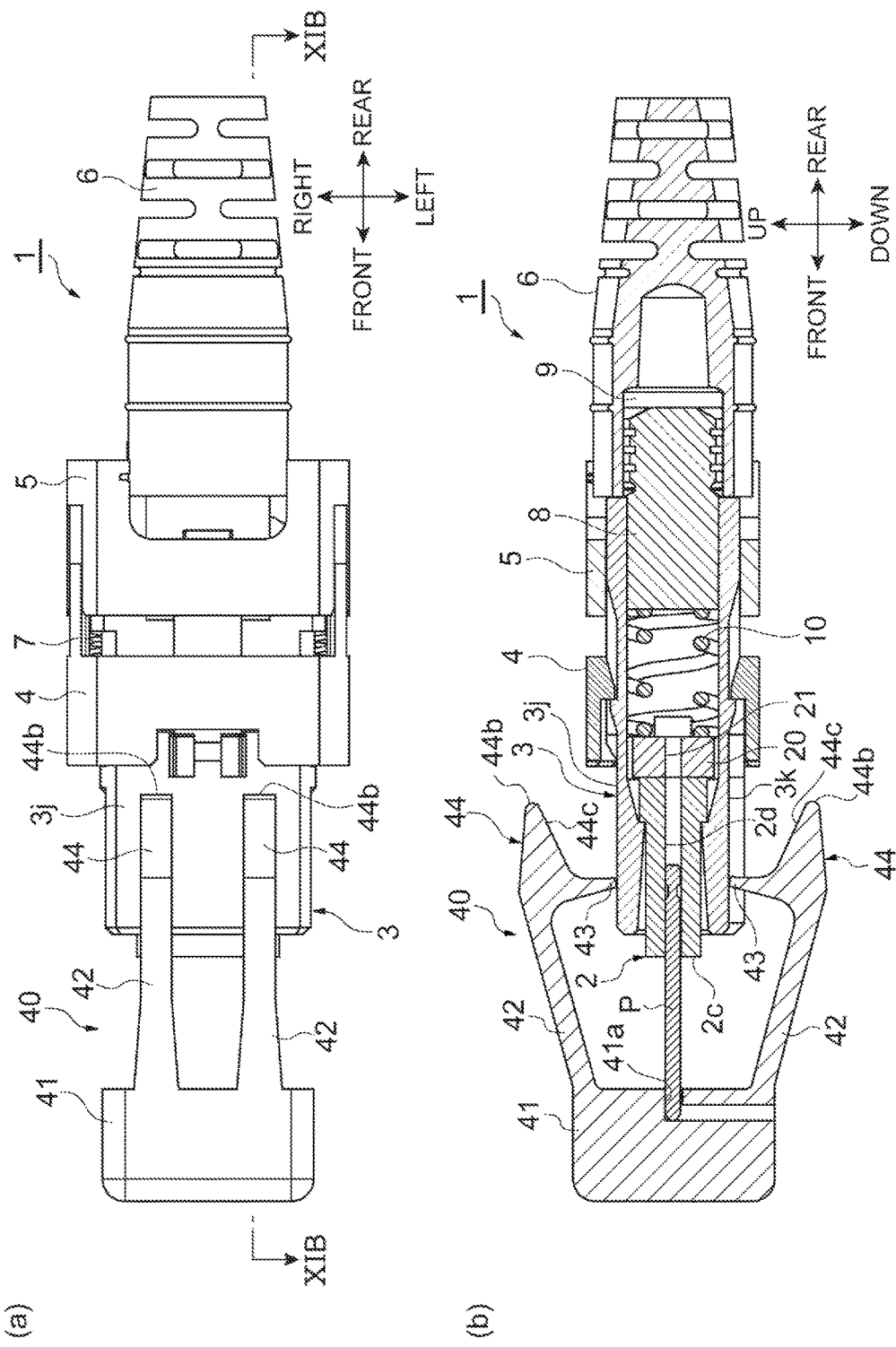

When the pin insertion jig 40 continues to be pushed, the respective pinching portions 43 ride on the upper and lower surfaces 3j and 3k of the inner housing 3 as illustrated in FIG. 11. The respective arm portions 42 start to be bent so as to be opened. Then, the guide pins P are inserted rearward in the insertion holes 2d of the ferrule 2. The respective pinching portions 43 slide rearward on the upper and lower surfaces 3j and 3k of the inner housing 3.

Figure 12:
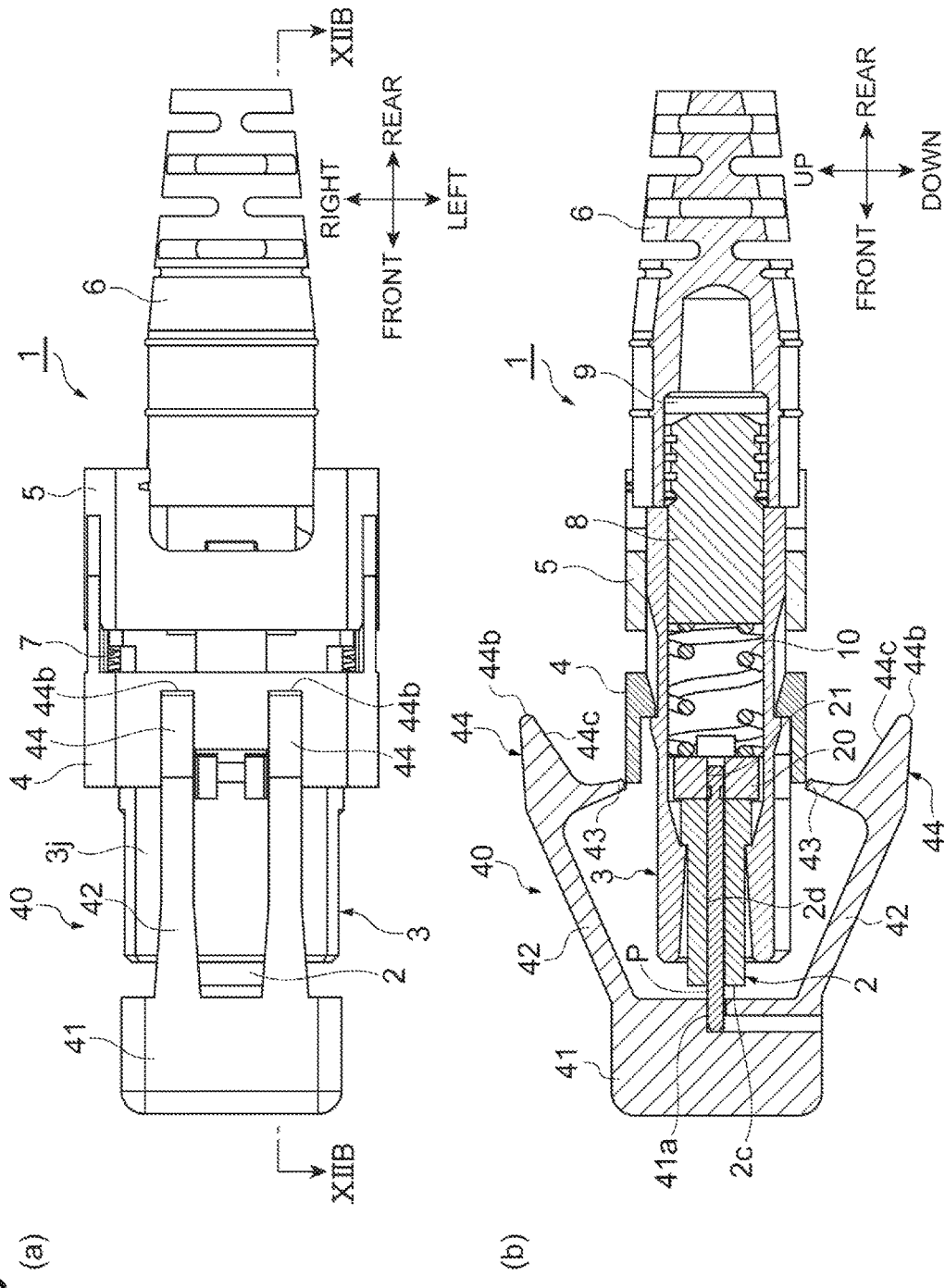

When the pin insertion jig 40 continues to be further pushed, the guide pins P are inserted into the retaining holes 21 of the pin keeper 20 from the front side as illustrated in FIG. 12. The guide pins P are retained by the retaining holes 21. At this time, the respective pinching portions 43 ride on the first outer housing 4. When the guide pins P are further pushed to the rear side in the retaining holes 21, the guide pins P are reliably retained by the retaining holes 21 and the insertion of the guide pins P is completed.

Next, effects, which are obtained from the optical connector 1, the pin keeper 20, and the pin insertion jig 40 of this embodiment, will be described.

The optical connector 1 according to this embodiment includes the pin keeper 20 that retains the guide pins P. The pin keeper 20 includes two side portions 22 and the bottom portion 23. The retaining holes 21 are formed on the inside surfaces 22a of the two side portions 22. The inside surfaces 22a of the side portions 22 of the pin keeper 20 are notched, so that the retaining holes 21 are formed. Accordingly, when the two side portions 22 are widened so as to be opened, the side portions 22 are bent and the retaining holes 21 are widened. In this state, the guide pins P can be inserted into the retaining holes 21.

When the two side portions 22 are widened so as to be opened in a state in which the guide pins P are inserted into the retaining holes 21 and are retained, the retaining holes 21 are widened. Accordingly, the guide pins P can be pulled out of the retaining holes 21. When the two side portions 22 are widened so as to be opened in this way, the guide pins P can be inserted into and removed from the retaining holes 21. Therefore, the guide pins P can be attached to and detached from the ferrule 2.

The thickness T1 of a portion of the side portion 22, which is positioned outside the retaining hole 21, is smaller than the thickness T2 of the bottom portion 23. Accordingly, since a portion of the side portion 22 positioned outside the retaining hole 21 can be more easily bent when the two side portions 22 are widened so as to be opened, the retaining holes 21 can be easily expanded. Since the guide pins P can be easily inserted into and removed from the retaining holes 21 of the pin keeper 20, the guide pins P can be easily attached to and detached from the ferrule 2. Since each side portion 22 includes the concave portion 22e, only a portion of the side portion 22 positioned outside the retaining hole 21 can be made thin, Accordingly, only portions of the side portions 22, which are positioned above the retaining holes 21, can be easily widened.

The inner housing 3 includes the first openings 3g into which the expansion portions 34 (the expansion member 30) expanding the space between the pair of side portions 22 are to be inserted. When the expansion portions 34 are inserted from the first openings 3g and come into contact with the insides (the tapered surfaces 22g) of the respective side portions 22, the pair of side portions 22 are pushed to be widened. Since the expansion portions 34 are inserted from the first openings 3g of the inner housing 3 and the retaining holes 21 are expanded, the guide pins P can be inserted into and removed from the retaining holes 21.

The expansion member 30 includes the pressing portions 31 that press the pin keeper 20 in the inner housing 3. The inner housing 3 includes the second openings 3h into which the pressing portions 31 are to be inserted and which are formed on the side of the inner housing 3 opposite to the first openings 3g. The retaining holes 21 can be expanded by the expansion member 30 in a state in which the pressing portions 31 are inserted into the inner housing 3 from the second openings 3h and the pin keeper 20 is pressed by the pressing portions 31.

Since the pin keeper 20 is pressed by the pressing portions 31 at the time of the expansion of the retaining holes 21 as described above, the movement of the pin keeper 20 at the time of the expansion can be suppressed. Accordingly, the retaining holes 21 can be expanded in a state in which the position of the pin keeper 20 is stabilized. Therefore, the guide pins P can be easily inserted into and removed from the retaining holes 21.

The optical connector 1 includes the first outer housing 4 that covers at least a part of the outer peripheral portion of the inner housing 3. The first outer housing 4 includes the notch 4b through which the first openings 3g of the inner housing 3 are exposed to the outside. Accordingly, when the expansion portions 34 are inserted into the first outer housing 4 from the notch 4b, the retaining holes 21 can be expanded.

The first outer housing 4 includes the notch 4c through which the second openings 3h of the inner housing 3 are exposed to the outside. Accordingly, the pressing portions 31 can press the pin keeper 20 by being inserted into the first outer housing 4 from the notch 4c of the first outer housing 4.

In the optical connector 1, the shape of the pin keeper 20 seen from the front side is the same as the shape of the pin keeper 20 seen from the rear side. Since the shape of the front surface of the pin keeper 20 is the same as the shape of the rear surface of the pin keeper 20 as described above, the pin keeper 20 can be mounted on the optical connector 1 without regard to the front and rear surfaces of the pin keeper 20. Accordingly, the pin keeper 20 can be easily mounted.

The pin insertion jig 40 according to this embodiment inserts the guide pins P into the insertion holes 2d of the ferrule 2. The pin insertion jig 40 includes the pinching portions 43 that pinch the guide pins P and the ride-on portions 44 that release the pinch of the guide pins P simultaneously with the insertion of the guide pins P by riding on the outside of the inner housing 3 and opening the pinching portions 43 at the time of the insertion of the guide pins P. Accordingly, the ride-on portions 44 can release the pinch by riding on the outside of the inner housing 3 at the time of the insertion of the guide pins P.

Therefore, the guide pins P can be smoothly inserted without coming into contact with the connection surface 2c.

(Second Embodiment)

Next, a pin keeper 120, an expansion member 130, and a pin insertion tool 140 of a second embodiment will be described. Since the structure of an optical connector of the second embodiment is the same as the structure of the optical connector 1 of the first embodiment, the structure of the optical connector of the second embodiment will be described using the same reference numerals as the reference numerals of the first embodiment. A ferrule 2, the pin keeper 120, and the peripheral structure thereof will be described in detail below.

Figure 13:
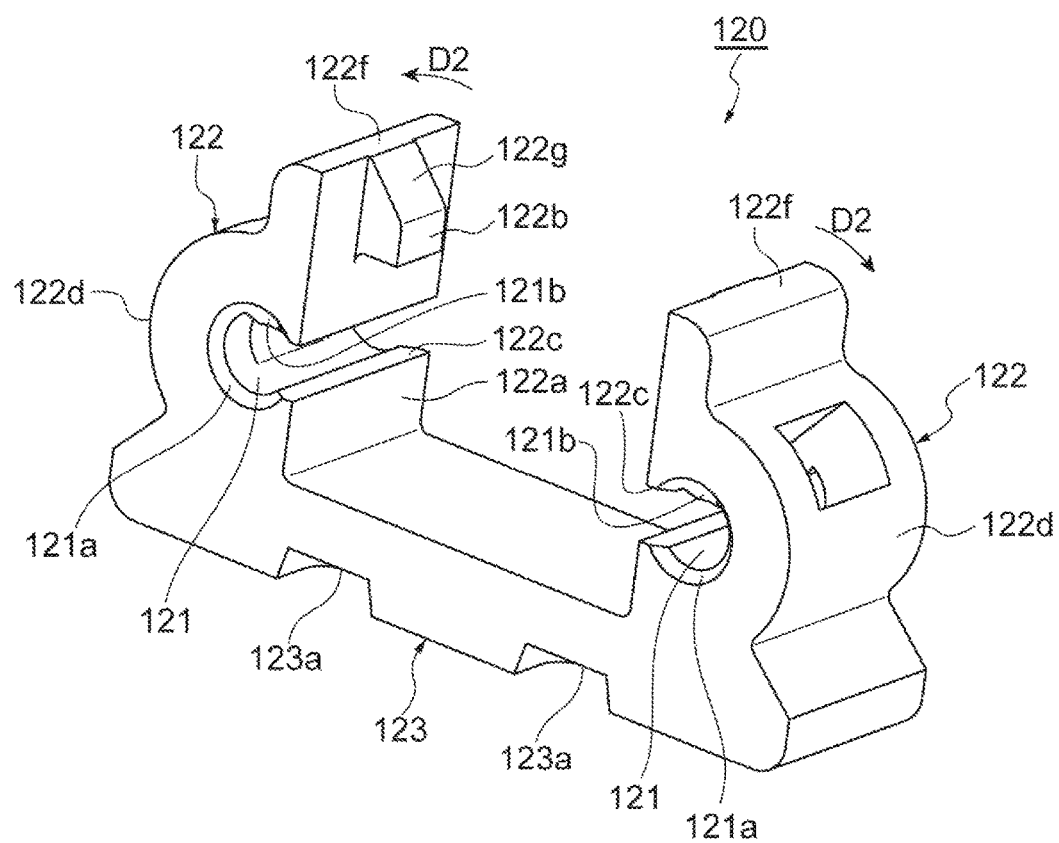
FIG. 13 is a perspective view of a pin keeper of a second embodiment.

As illustrated in FIGS. 13 and 14, the pin keeper 120 is formed in a U shape. The pin keeper 120 includes a pair of side portions 122 that is arranged in parallel to each other, and a bottom portion 123 that connects end portions of the pair of side portions 122. Retaining holes 121 are formed in a shape in which side surfaces 122a of the side portions 122 facing each other are notched. Tapered surfaces 121a are formed at inlet-side end portions of the retaining holes 121. Guide pins P can be smoothly inserted into the retaining holes 121 by the tapered surfaces 121a. A convex portion 121b, which is to be fitted to a concave portion P1 formed on the surface of each guide pin P, is formed on the inner surface of each of the retaining holes 121.

The pair of side portions 122 can be opened by being bent in a direction D2 in which the side portions 122 are separated from each other by an expansion member 130 to be described below. The pin keeper 120 is formed in a shape where the front surface and the rear surface are symmetrical to each other. When the pin keeper 120 is mounted on the optical connector 1, the shape of the pin keeper 120 seen from the front side is the same as the shape of the pin keeper 120 seen from the rear side. Each of the side portions 122 includes a protruding portion 122b that protrudes toward the inside of the pin keeper 120 at an end portion of the side portion 122 opposite to the bottom portion 123, and a notch 122c that is formed on the side surface 122a.

The protruding portion 122b includes a tapered surface 122g that is inclined toward the inside of the pin keeper 120 from an upper end portion 122f of the side portion 122. When first projection portions 131 of the expansion member 130 come into contact with the tapered surfaces 122g from the upper side, the pair of side portions 122 is widened in the direction D2. The above-mentioned retaining hole 121 is formed in each of the notches 122c. When the pair of side portions 122 is widened in the direction D2, the upper portions of the side portions 122 are bent and the notches 122c are widened. Accordingly, the retaining holes 121 are also widened.

An outside portion 122d, which is positioned outside each retaining hole 121, is curved in an arc shape along the outer periphery of the retaining hole 121. The thickness T3 of the outside portion 122d is smaller than the thickness T4 of the bottom portion 123. Accordingly, since the outside portion 122d positioned outside the retaining hole 121 can be easily bent when the pair of side portions 122 is widened, the retaining holes 121 can be easily expanded.

Concave portions 123a to which second projection portions 134 of the expansion member 130 are to be fitted are formed on the bottom portion 123. Four concave portions 123a are formed on the lower surface of the bottom portion 123. Each of the concave portions 123a is formed so as to be notched from the front surface or the rear surface of the bottom portion 123. Two concave portions 123a are arranged in the thickness direction of the pin keeper 120 (the front-rear direction) so as to make a pair, and sets of the two concave portions 123a are arranged in the left-right direction.

Figure 15:
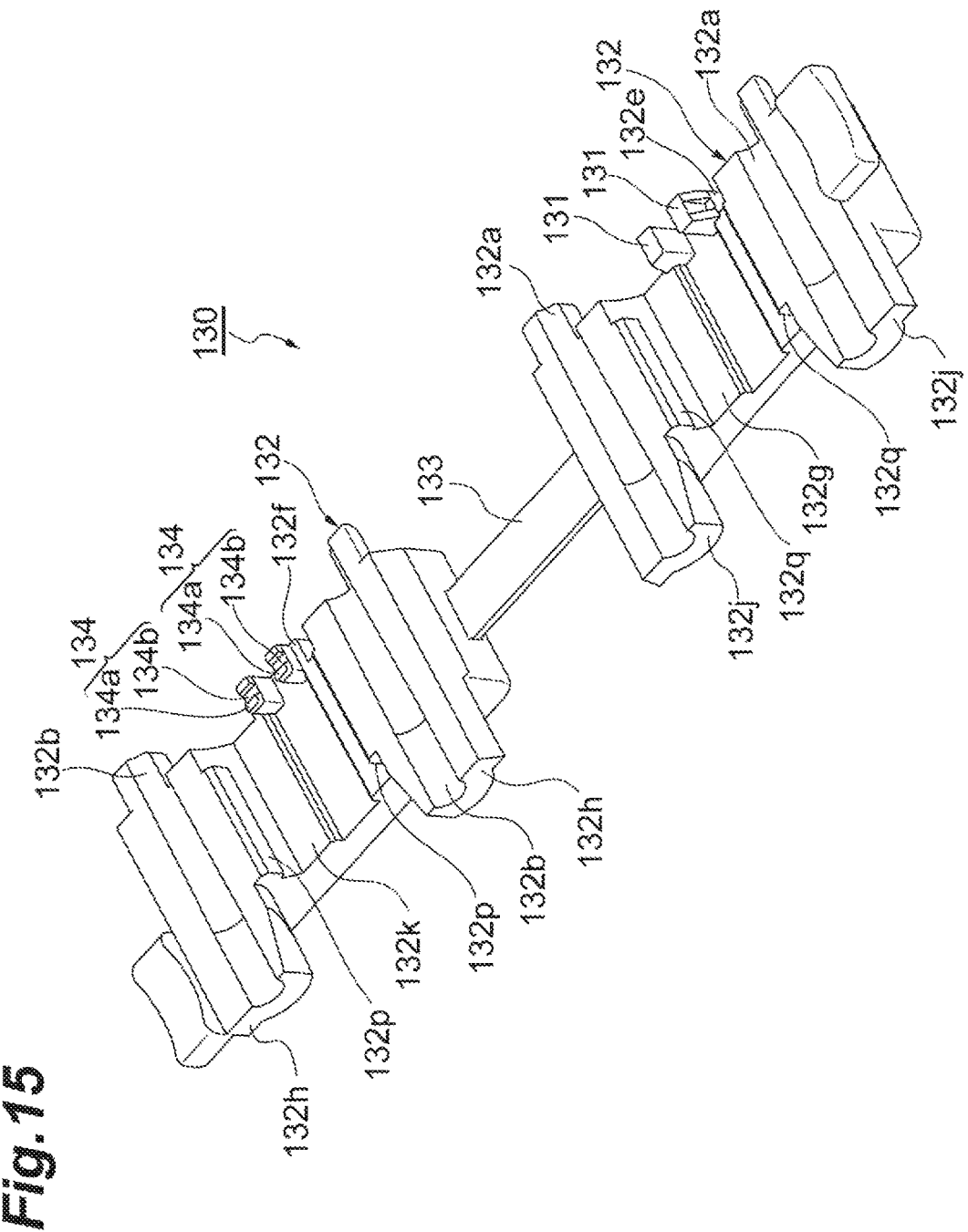
FIG. 15 is a perspective view of an expansion member according to the second embodiment.
Figure 16:
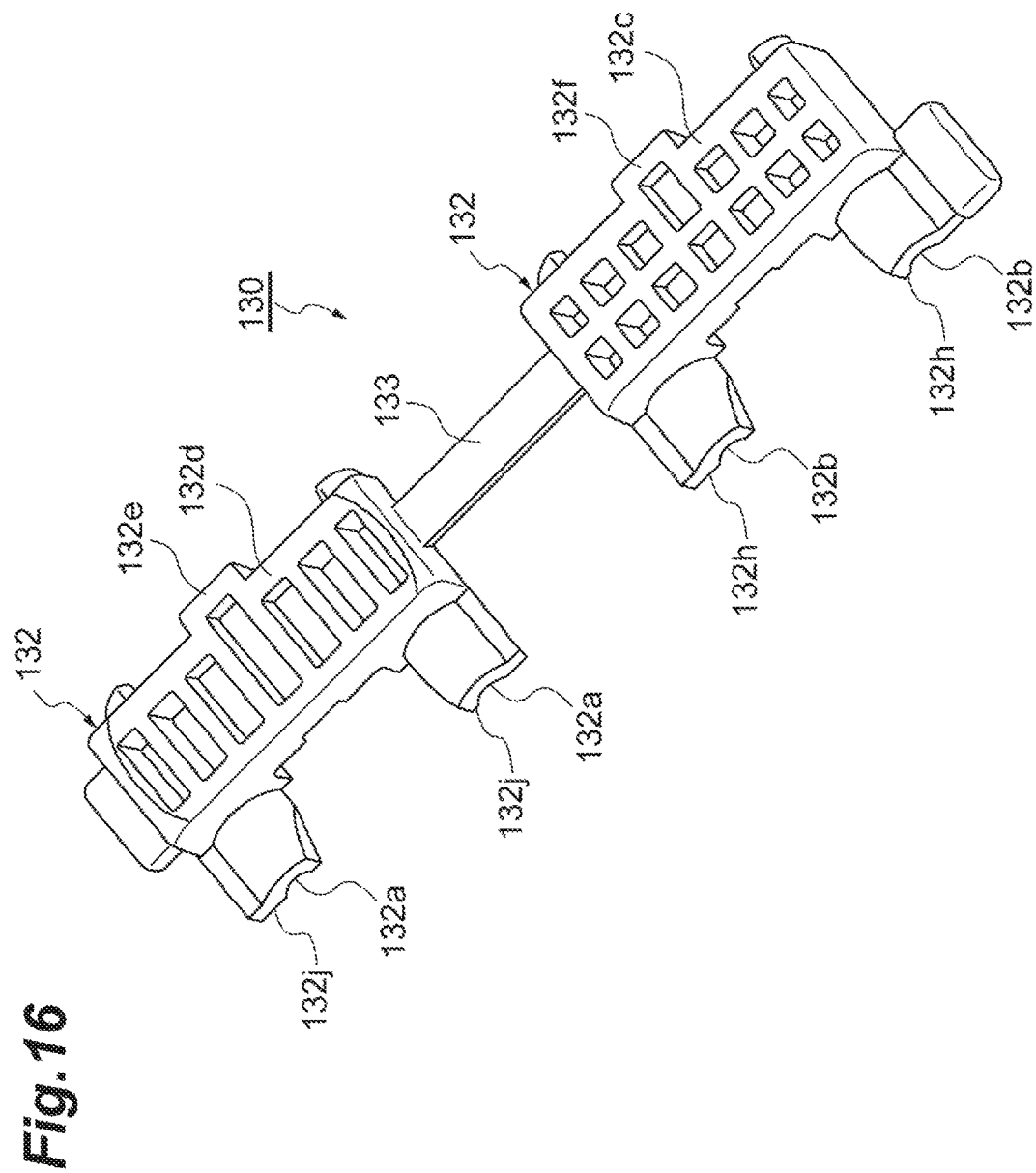
FIG. 16 is a perspective view of the expansion member seen from the opposite side to FIG. 15.
Figure 17:
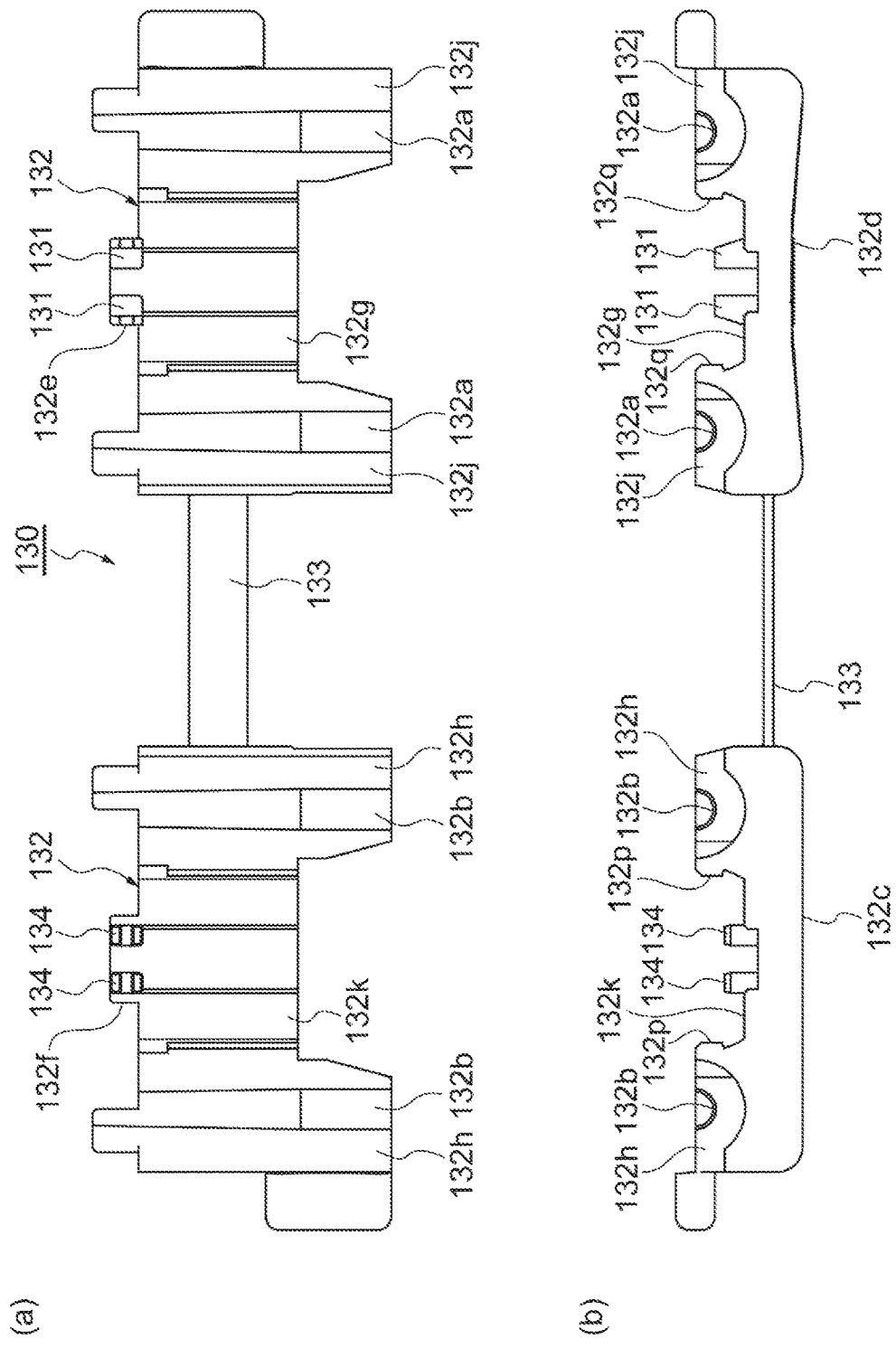

Next, the expansion member 130, which widens the pair of side portions 122 in the direction D2, will be described with reference to FIGS. 15 to 17. As illustrated in FIGS. 15 to 17, the expansion member 130 includes first projection portions 131 that expand the retaining holes 121, a pair of pinching portions 132 that pinches the inner housing 3 from the upper and lower sides, a flexible connecting portion 133 that connects the, pair of pinching portions 132, and second projection portions 134 that come into contact with the bottom portion 123 of the pin keeper 120.

The first projection portions 131 push and widen the pair of side portions 122 and expand the retaining holes 121 by being inserted from the openings 3g of the inner housing 3 and coming into contact with the side portions 122 of the pin keeper 120. The first projection portions 131 are provided on one of the two pinching portions 132. The first projection portions 131 protrude upward from a protruding portion 132e that protrudes toward the rear side of the pinching portions 132. Two first projection portions 131 are symmetrically provided on the protruding portion 132e. There is a case in which the pin keeper 120 is installed on the inner housing 3 so as to be inverted in the vertical direction (in the left-right direction in FIG. 22), and the first projection portions 131 are inserted from the openings 3h of the inner housing 3 in this case.

One pinching portion of the two pinching portions 132 is provided with a pair of left and right concave portions 132a that is notched in a semicircular shape, a pair of left and right protruding portions 132j that protrude forward more than peripheral portions, a concave portion 132g that is positioned between the pair of protruding portions 132j, and a protruding portion 132e that protrudes rearward from the concave portion 132g. The concave portions 132a are formed on the protruding portions 132j. The concave portions 132a extend in the front-rear direction from one end of the pinching portion 132 to the other end of the pinching portion 132.

The other pinching portion of the two pinching portions 132 is provided with a pair of left and right concave portions 132b that is notched in a semicircular shape, a pair of left and right protruding portions 132h that protrude forward more than peripheral portions, a placement portion 132k which is positioned between the pair of protruding portions 132h and on which the inner housing 3 is placed, and a protruding portion 132f that protrudes rearward from the placement portion 132k.

The concave portions 132b are formed on the protruding portions 132h, and extend in the front-rear direction from one end of the pinching portion 132 to the other end of the pinching portion 132. The placement portion 132k is formed in a concave shape between the pair of protruding portions 132h. The placement portion 132k is provided with convex portions 132p that are inserted into concave portions 3n (see FIG. 1) formed on the outer surface of the inner housing 3. A pair of convex portions 132p is provided. The two convex portions 132p protrude from both side surfaces of the placement portion 132k. The concave portion 132g is provided with the same convex portions 132q as the convex portions 132p. Since the convex portions 132p and 132q are provided as described above, the convex portions 132p and 132q can be fitted to the concave portions 3n of the inner housing 3. Accordingly, the inner housing 3 can be separated from the expansion member 130 in a state in which the inner housing 3 is pinched from the upper and lower sides by the pinching portions 132.

A back surface 132c of the pinching portion 132 on which the second projection portions 134 are provided is a flat surface. A back surface 132d of the pinching portion 132 on which the first projection portions 131 are provided is dented in a curved shape. Due to the back surface 132d, the expansion member 130 is formed in a shape that allows the first projection portions 131 to be easily pushed against the inner housing 3.

The connecting portion 133 connects the pair of pinching portions 132. The connecting portion 133 is narrower than the pinching portions 132, and linearly extends between the two pinching portions 132. The connecting portion 133 is formed to be thinner than the pinching portions 132. Accordingly, the connecting portion 133 can be bent so that the pair of pinching portions 132 faces each other. When the pair of pinching portions 132 faces each other, the concave portions 132a are combined with the concave portions 132b. When one concave portion 132a and the other concave portion 132b are combined with each other as described above, a hole portion H (see FIG. 21) into which each positioning pin 142 to be described below is to be inserted is formed.

The second projection portions 134 are provided on the other pinching portion (the pinching portions 132 on which the first projection portions 131 are not provided) of the two pinching portions 132. The second projection portions 134 are inserted from the openings 3h of the inner housing 3. The second projection portions 134 press the pin keeper 120 in the inner housing 3 by coming into contact with the bottom portion 123 of the pin keeper 120. The second projection portions 134 protrude upward from the protruding portion 132f of the pinching portion 132. The two second projection portions 134 are symmetrically provided on the protruding portion 132f.

Each of the second projection portions 134 includes a surface 134b that is positioned at the upper end of the second projection portion 134, and projections 134a that further protrude from the surface 134b at positions between which the surface 134b is interposed in the front-rear direction. When the second projection portions 134 come into contact with the bottom portion 123, the projections 134a are fitted to the concave portions 123a (see FIG. 14) of the bottom portion 123. The second projection portions 134 and the bottom portion 123 are adapted to be fitted to each other as described above. Accordingly, the contact of the second projection portions 134 with the bottom portion 123 can be stably performed.

Next, a pin insertion tool 140, which inserts the guide pins P into the retaining holes 121, will be described with reference to FIGS. 18 and 19. The pin insertion tool 140 includes a body portion 141, two positioning pins (connecting portions) 142 that are connected to the expansion member 130, and a pin retaining portion 143 that is positioned between the two positioning pins 142 and protrudes from the body portion 141 in the same direction as the positioning pins 142.

The shape of the body portion 141 seen in the front-rear direction is the shape of a butterfly. The body portion 141 includes a concave portion 141a that is positioned in the middle portion thereof in the left-right direction, and convex portions 141b that protrude on both sides of the concave portion 141a in the left-right direction. The positioning pins 142 has a function to connect the pin insertion tool 140 to the expansion member 130 and a function to position the pin insertion tool 140 relative to the expansion member 130. The two positioning pins 142 are formed in the shape of a rod, and protrude from the body portion 141 in the same direction.

The pin retaining portion 143 includes holes 143a into which the guide pins P are to be preliminarily inserted, a pair of plate-like portions 143b that is provided above and below the holes 143a, and connecting portions 143d that connect the holes 143a to the plate-like portions 143b in the vertical direction. The holes 143a are formed so as to be recessed in a direction opposite to the direction in which the positioning pins 142 extend. When the guide pins P are inserted into the holes 143a, the guide pins P extend in the same direction as the positioning pins 142. The middle portions of the connecting portions 143d are recessed toward the back side of the plane of paper. The hole 143a is formed at each of the middle portions of the connecting portions 143d.

Figure 20:
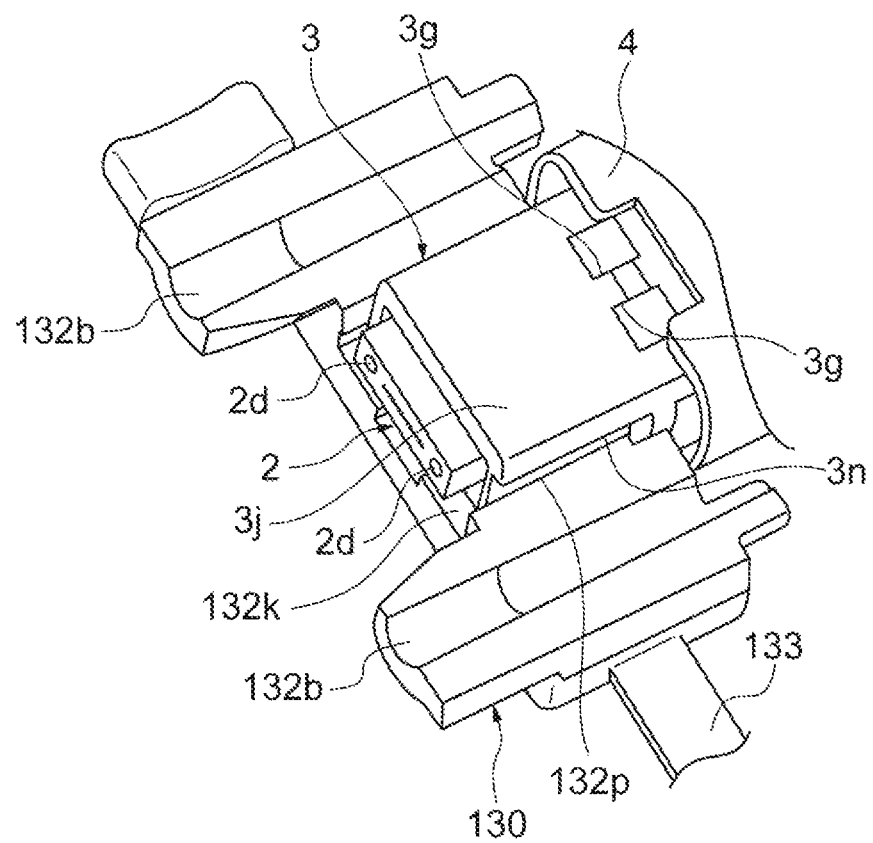
FIG. 20 is a perspective view illustrating a state in which an inner housing is placed on the expansion member.

A method of mounting the guide pins P on the optical connector 1 by using the pin insertion tool 140 having the above-mentioned structure will be described with reference to FIGS. 20 to 24. First, as illustrated in FIG. 20, the convex portions 132p of the pinching portion 132 are fitted to the concave portions 3n of the inner housing 3 and the inner housing 3 is placed on the placement portion 132k. At this time, the second projection portions 134 are inserted into the openings 3h formed on the lower surface of the inner housing 3. Since the second projection portions 134 are inserted into the inner housing 3 as described above, the pin keeper 120 is pressed in the inner housing 3.

Figure 21:
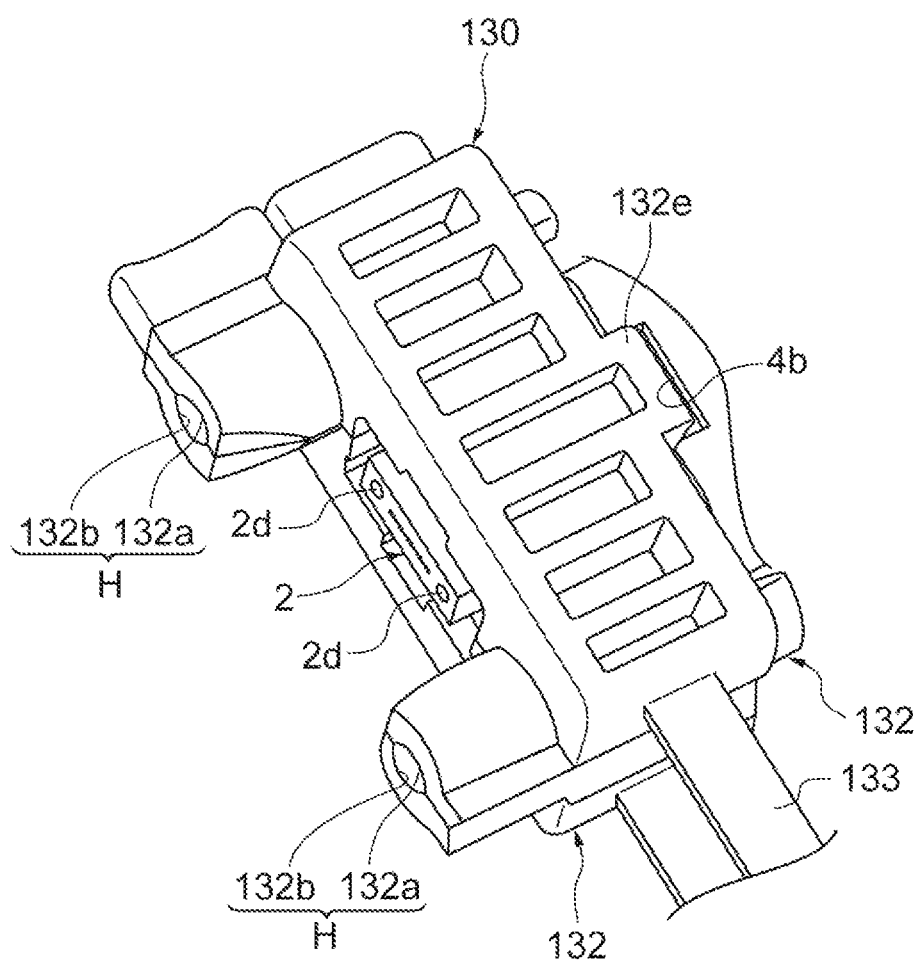
FIG. 21 is a perspective view illustrating a state in which the inner housing is surrounded by the expansion member.

Next, as illustrated in FIG. 21, the other pinching portion 132 covers the upper surface 3j of the inner housing 3, and the ferrule 2 and the inner housing 3 are pinched from the upper and lower sides. At this time, the protruding portions 132e and 132f are fitted to the notches 4b and 4c of the first outer housing 4, respectively. Since the concave portion 132a and the concave portions 132b are combined with each other in this state, the hole portions H into which the positioning pins 142 are to be inserted are formed.

Figure 22:
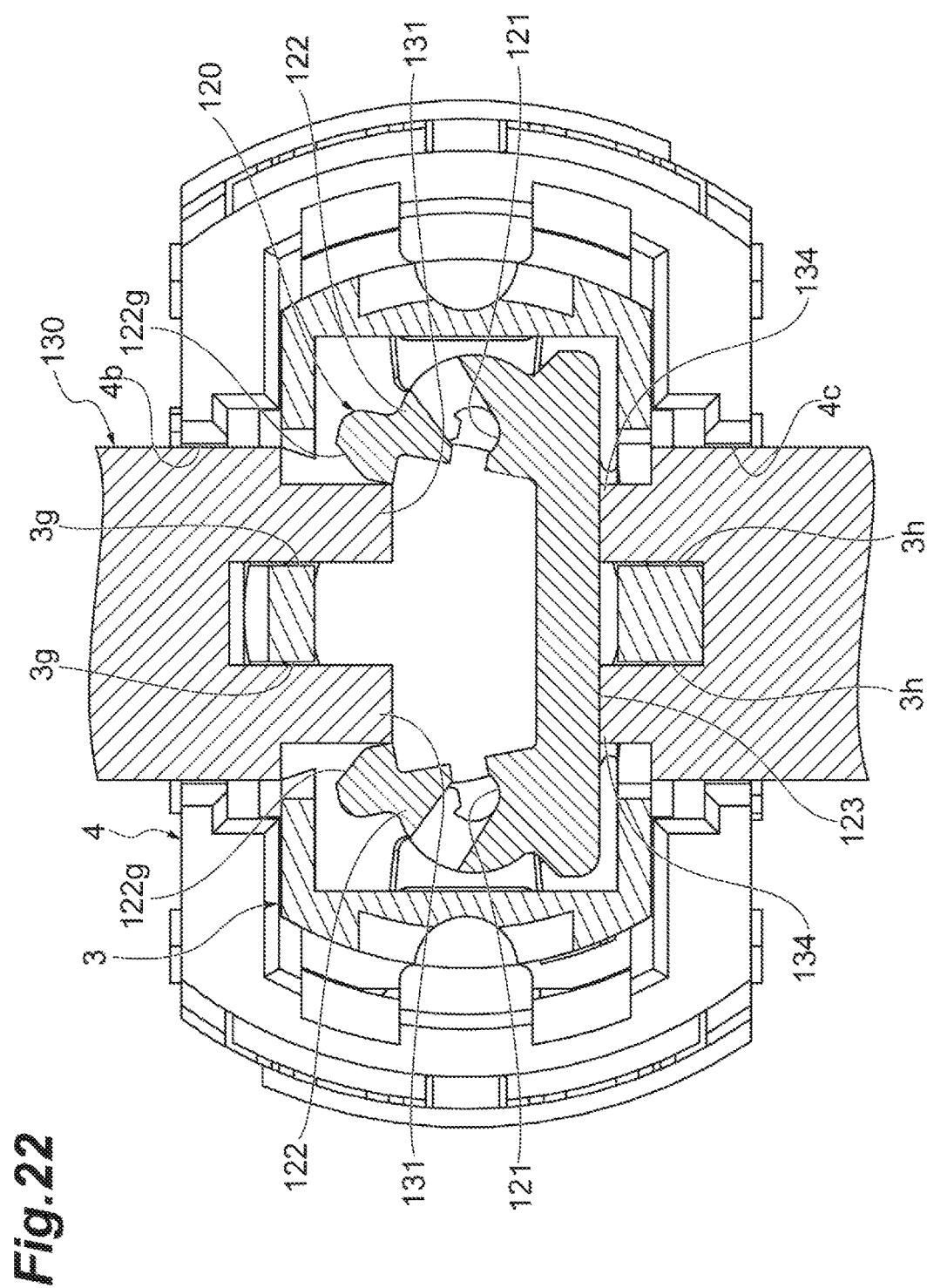
FIG. 22 is a cross-sectional view illustrating a state in which a retaining hole is expanded by the expansion member of FIG. 21.

As illustrated in FIG. 22, the first projection portions 131 are inserted into the inner housing 3 from the openings 3g of the inner housing 3. First, the first projection portions 131 come into contact with the tapered surfaces 122g of the side portions 122 of the pin keeper 120. Then, when the first projection portions 131 are further inserted, the first projection portions 131 go over the tapered surfaces 122g and the respective side portions 122 are pushed to be bent and widened. Since the side portions 122 are pushed to be bent and widened as described above, the retaining holes 121 are expanded. The guide pins P are inserted into the expanded retaining holes 121 by using the pin insertion tool 140.

Figure 23:
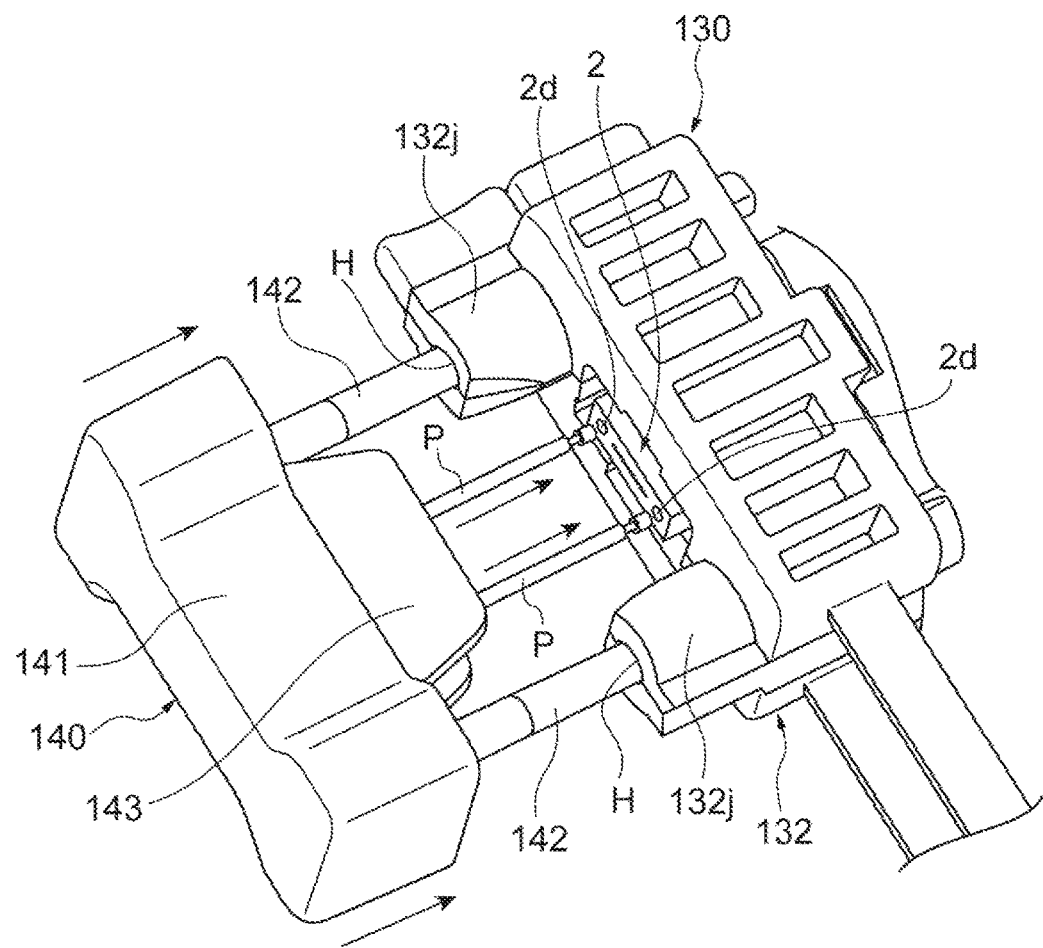
FIG. 23 is a perspective view illustrating a state in which pins are inserted by the pin insertion tool.

As illustrated in FIG. 23, the guide pins P are inserted into the holes 143a of the pin retaining portion 143 before the insertion of the guide pins P and the guide pins P are retained by the pin retaining portion 143. Then, when the positioning pins 142 are inserted into the hole portions H of the expansion member 130 from the front side, the pin insertion tool 140 is connected to the expansion member 130. When the pin retaining portion 143 is pushed against the expansion member 130 in this state, the guide pins P are inserted into the insertion holes 2d.

Figure 24:
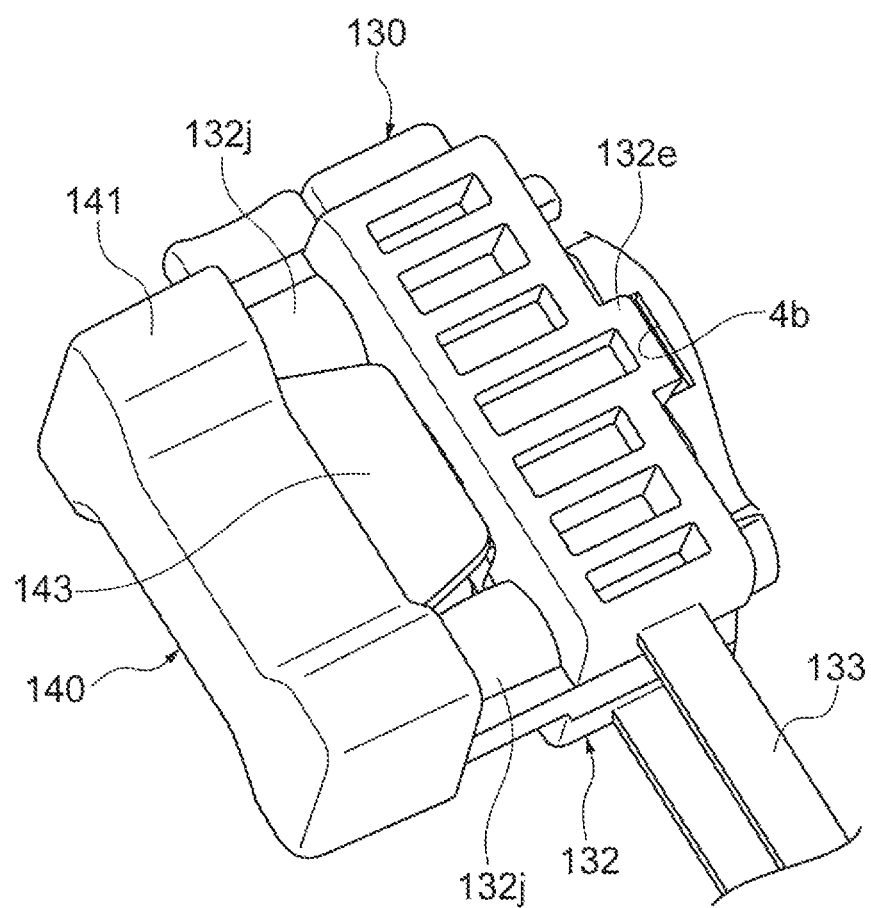
FIG. 24 is a perspective view illustrating a state in which pins are inserted by the pin insertion tool.

Subsequently, when the pin retaining portion 143 is pushed against the expansion member 130 as illustrated in FIG. 24, the guide pins P are inserted into the retaining holes 121 of the pin keeper 120. When the expansion member 130 is removed from the inner housing 3 in a state in which the guide pins P are inserted into the retaining holes 121, the first projection portions 131 are removed from the inner housing 3. Accordingly, since the bending of the side portions 122 and the expansion of the retaining holes 121 are released, the retaining holes 121 retain the guide pins P. The guide pins P can be retained by the retaining holes 121 in this way, and the mounting of the guide pin P on the optical connector 1 is completed when the pin insertion tool 140 is removed.

As for a method of removing the guide pins P from the optical connector 1, when the inner housing 3 is pinched from the upper and lower sides by the pinching portions 132 as illustrated in FIGS. 21 and 22, the retaining holes 121 are expanded by the first projection portions 131. The retaining holes 121 are expanded in this way and the guide pins P are pulled out of the insertion holes 2d, so that the guide pins P can be easily removed from the optical connector 1.

Next, functional effects, which are obtained from the expansion member 130 and the pin insertion tool 140 of this embodiment, will be described.

The first projection portions 131 of the expansion member 130 expand the retaining holes 121 of the pin keeper 120 by pushing and widening the pair of side portions 122. Accordingly, when the guide pins P are inserted into the expanded retaining holes 121, the guide pins P can be retained by the retaining holes 121. Therefore, since the guide pins P are inserted into the insertion holes 2d and the guide pins P are retained by the retaining holes 121, the guide pins P can be mounted on the optical connector 1. Since the guide pins P, which are retained by the retaining holes 121, are pulled out of the retaining holes 121 after the retaining holes 121 are expanded by the expansion member 130, the guide pins P can be removed from the retaining holes 121 and the insertion holes 2d. Accordingly, the guide pins P are pulled out in a state in which the retaining holes 121 are expanded, and the guide pins P are removed from the insertion holes 2d. Therefore, the guide pins P can be removed from the optical connector 1. As described above, the guide pins P can be attached to and detached from the ferrule 2.

The expansion member 130 includes the second projection portions 134 that are inserted from the openings 3h positioned on the side opposite to the openings 3g. The second projection portions 134 press the pin keeper 120 in the inner housing 3 by coming into contact with the bottom portion 123. Since the second projection portions 134 press the pin keeper 120 as described above, the movement of the pin keeper 120 at the time of the expansion of the retaining holes 121 can be suppressed. Accordingly, the retaining holes 121 can be expanded in a state in which the position of the pin keeper 120 is stabilized. Therefore, the guide pins P can be easily attached to and detached from the retaining holes 121.

The expansion member 130 includes the placement portion 132k on which the inner housing 3 is placed so that the second projection portions 134 are inserted into the openings 3h. The placement portion 132k is provided with the convex portions 132p that are to be inserted into the concave portions 3n formed on the outer surface of the inner housing 3. When the inner housing 3 is placed on the placement portion 132k, the convex portions 132p are inserted into the concave portions 3n and the second projection portions 134 are inserted into the openings 3h. Accordingly, since the inner housing 3 can be stabilized on the placement portion 132k, the second projection portions 134 are inserted in a state in which the inner housing 3 is stabilized. Therefore, since the pin keeper 120 can be stably pressed by the second projection portions 134, the guide pins P can be more easily attached to and detached from the retaining holes 121.

The projections 134a to be fitted to the concave portions 123a of the bottom portion 123 are arranged on the second projection portions 134 in the front-rear direction. Accordingly, the movement of the pin keeper 120 in the front-rear direction is restricted when the second projection portions 134 come into contact with the bottom portion 123. Therefore, when the guide pins P are inserted into the retaining holes 121, a phenomenon in which the guide pins P and the pin keeper 120 are moved rearward can be avoided. That is, since the pin keeper 120 is not moved at the time of the insertion of the guide pins P, the guide pins P can be more smoothly inserted.

The pin insertion tool 140 inserts the guide pins P into the retaining holes 121 in a state in which the retaining holes 121 are expanded by the expansion member 130. The pin insertion tool 140 is connected to the expansion member 130 by the positioning pins 142. Since the guide pins P are inserted into the retaining holes 121 in this state, the guide pins P can be stably inserted. Accordingly, since the guide pins P can be smoothly inserted into the retaining holes 121, the guide pins P can be easily mounted on the optical connector 1. Further, the two positioning pins 142 are provided at positions that are symmetrical with respect to the guide pins P. Accordingly, the guide pins P can be inserted in balance by the push of the pin insertion tool 140.

In the pin insertion tool 140, each positioning pin 142 is formed in the shape of a rod that protrudes in a direction in which the guide pin P extends. The positioning pins 142 are connected to the expansion member 130 by being inserted into the hole portions H formed in the expansion member 130. Accordingly, the pin insertion tool 140 can be easily connected to the expansion member 130 by only the insertion of the rod-like positioning pins 142 into the hole portions H. Therefore, the guide pins P can be more smoothly inserted into the retaining holes 121.

The embodiments of the invention have been described above, but the invention is not limited to the above-mentioned embodiments and can be modified without departing from the scope of the invention. For example, the optical connector according to the invention can be widely applied to various optical connectors for multiple fibers or a single fiber. Further, the above-mentioned optical connector 1 may be a so-called field-assembly optical connector that is assembled with an optical fiber cord in the field.

The optical connector 1 including the inner housing 3, the first outer housing 4, and the second outer housing 5 has been described in the embodiments. However, the components of the housing receiving the ferrule 2 and the pin keeper 20 or 120 can be appropriately changed without being limited to the inner housing 3, the first outer housing 4, and the second outer housing 5. For example, the optical connector may include one outer housing instead of the first outer housing 4 and the second outer housing 5. Alternatively, the optical connector may include only the inner housing 3.

The first outer housing 4 has included the notches 4b and 4c in the embodiments, but may have a shape other than the notch. For example, the first outer housing 4 may include hole portions instead of the notches 4b and 4c.

Examples in which the pin keepers 20 and 120 are formed in a shape where the front surface and the rear surface are symmetrical to each other have been described in the embodiments. However, the pin keeper according to the invention may not be formed in a shape where the front surface and the rear surface are symmetrical to each other. The shape of the pin keeper according to the invention is not limited to the shapes of the pin keepers 20 and 120 of the embodiments and may be appropriately changed.

The expansion member and the pin insertion tool according to the invention can be applied to various optical connectors other than the optical connector 1. For example, the expansion member 130 including the pair of pinching portions 132 has been described in the second embodiment. However, the expansion member may not include the pinching portion. The shape of the expansion member can be appropriately changed without being limited as described above. The shape of the pin insertion tool can also be appropriately changed without being limited.

INDUSTRIAL APPLICABILITY

The invention can be used as an optical connector, a pin keeper, a pin insertion jig, an expansion member, and a pin insertion tool that allow pins to be attached to and detached from a ferrule.

REFERENCE SIGNS LIST

1: optical connector
2: ferrule
2a: expansion portion
2b: front surface
2c: connection surface
2d: insertion hole
3: inner housing (housing)
3a: expansion portion
3b: engagement hole
3c: groove
3d: contact surface
3f: rear end
3g: first opening
3h: second opening
3j: upper surface
3k: lower surface
3n: concave portion
4: first outer housing (outer housing)
4a: claw portion
4b: notch (opening portion)
4c: notch (opening portion)
5: second outer housing
5a: slit
5c: notched portion
5d: side surface
5e: stepped portion
5f: rear end face
6: boot
7: coil spring
8: rear housing
8a: insertion portion
8b: cylindrical portion
8c: uneven portion
9: caulking ring
9a: large-diameter portion
9b: small-diameter portion
10: ferrule spring
20, 120: pin keeper
21, 121: retaining hole
21a, 121a: tapered surface
22, 122: side portion
22a, 122a: inside surface
22b, 122b: protruding portion
22c: notched portion
22d: outside surface
22e: concave portion
22f: upper end face
22g, 122g: tapered surface
23, 123: bottom portion
30, 130: expansion member
31: pressing portion
31a: lower step portion
31b: upper step portion
32: first base
32a: first surface
32b: second surface
32c: concave portion
33: second base
34: expansion portion
34a: lower step portion
34b: upper step portion
40: pin insertion jig
41: body portion
41a: hole
41b: upper surface
41c: lower surface
42: arm portion
43: pinching portion
44: ride-on portion
44a: tapered surface
44b: apex portion
44c: tapered surface
121b: convex portion
122d: outside portion
122f: upper end portion
123a: concave portion
131: first projection portion
132: pinching portion
132a, 132b: concave portion
132e, 132f: protruding portion
132g: concave portion
132h, 132j: protruding portion
132k: placement portion
132p: convex portion
133: connecting portion
134: second projection portion
134a: projection
134b: surface
140: pin insertion tool
141: body portion
141a: concave portion
141b: convex portion
142: positioning pin (connecting portion)

143: pin retaining portion
143*a*: hole
143*b*: plate-like portion
143*d*: connecting portion
D1 to D4: direction
H: hole portion
L: reference line
P: guide pin (pin)
P1: concave portion

The invention claimed is:

1. An optical connector that is connected to another connector in a predetermined connection direction, the optical connector comprising:
   a ferrule that includes insertion holes into which pins to be connected to the another connector are to be inserted; and
   a pin keeper that is provided on a side of the ferrule opposite to the another connector and includes retaining holes retaining the pins inserted into the insertion holes,
   wherein the pin keeper includes a pair of side portions in which the retaining holes are formed, and a bottom portion that connects end portions of the pair of side portions, and
   the retaining holes are formed in a shape in which inside surfaces of the side portions facing each other are notched, the optical connector further comprising
   a housing that receives the ferrule and the pin keeper,
   wherein the housing includes a first opening through which an expansion member widening the pair of side portions is inserted into the housing, and
   the pair of side portions is pushed to be widened when the expansion member is inserted from the first opening and comes into contact with the inside of each of the side portions.

2. The optical connector according to claim 1,
   wherein the thickness of a portion of the side portion, which is positioned outside the retaining hole, is smaller than the thickness of the bottom portion.

3. The optical connector according to claim 1,
   wherein the expansion member includes a pressing portion that presses the pin keeper in the housing, and
   the housing includes a second opening through which the pressing portion is inserted into the housing and which is formed on a side of the housing opposite to the first opening.

4. The optical connector according to claim 3, further comprising:
   an outer housing that covers at least a part of an outer peripheral portion of the housing,
   wherein the outer housing includes an opening portion through which the second opening of the housing is exposed to the outside.

5. The optical connector according to claim 1, further comprising:
   an outer housing that covers at least a part of an outer peripheral portion of the housing,
   wherein the outer housing includes an opening portion through which the first opening of the housing is exposed to the outside.

6. The optical connector according to claim 1,
   wherein the shape of the pin keeper seen from one side in the connection direction is the same as the shape of the pin keeper seen from the other side in the connection direction.

7. A pin insertion jig that inserts the pins into the insertion holes of the ferrule in an optical connector that is connected to another connector in a predetermined connection direction, the optical connector comprising:
   a ferrule that includes insertion holes into which pins to be connected to the another connector are to be inserted; and
   a pin keeper that is provided on a side of the ferrule opposite to the another connector and includes retaining holes retaining the pins inserted into the insertion holes,
   wherein the pin keeper includes a pair of side portions in which the retaining holes are formed, and a bottom portion that connects end portions of the pair of side portions, and
   the retaining holes are formed in a shape in which inside surfaces of the side portions facing each other are notched,
   the pin insertion jig comprising:
   pinching portions that pinch the pins; and
   ride-on portions that are provided outside the pinching portions and release the pinch of the pins simultaneously with the insertion of the pins by riding on the outside of the housing and opening the pinching portions at the time of the insertion of the pins.

8. An expansion member that expands retaining holes of a pin keeper retaining pins inserted into insertion holes of a ferrule of an optical connector,
   wherein the pin keeper includes a pair of side portions in which the retaining holes are formed, and a bottom portion that connects end portions of the pair of side portions,
   the retaining holes are formed in a shape in which side surfaces of the side portions facing each other are notched, and
   the optical connector includes a housing that receives the pin keeper,
   the expansion member further comprising:
   a first projection portion that push and widen the pair of side portions and expands the retaining holes by being inserted from the first opening formed in the housing and coming into contact with the respective side portions.

9. The expansion member according to claim 8, further comprising:
   a second projection portion that is inserted from a second opening positioned on a side of the housing opposite to the first opening,
   wherein the second projection portion presses the pin keeper in the housing by coming into contact with the bottom portion.

10. The expansion member according to claim 9, further comprising:
    a placement portion on which the housing is placed so that the second projection portion is inserted into the second opening,
    wherein the placement portion is provided with a convex portion that is inserted into a concave portion formed on the outer surface of the housing.

11. A pin insertion tool that inserts pins into the retaining holes expanded by the expansion member according to claim 8, the pin insertion tool comprising:
    a pin retaining portion that retains the pins; and
    a connecting portion that is connected to the expansion member,
    wherein the pins are inserted into the retaining holes when the pin retaining portion is pushed against the expansion member in a state in which the pin insertion tool is connected to the expansion member by the connecting portion.

12. The pin insertion tool according to claim 11, wherein the connecting portion is formed in the shape of a rod that protrudes in a direction in which the pin extends, and is connected to the expansion member by being inserted into a hole portion formed in the expansion member.

* * * * *